United States Patent
Madsen et al.

(10) Patent No.: US 7,457,439 B1
(45) Date of Patent: Nov. 25, 2008

(54) SYSTEM AND METHOD FOR MOTION CAPTURE

(75) Inventors: Nels Howard Madsen, Auburn, AL (US); Thomas M. McLaughlin, Marietta, GA (US); Ronnie J. H. Wilmink, Marietta, GA (US); Robert Michael Glover, Marietta, GA (US)

(73) Assignee: Motion Reality, Inc., Marietta, GA (US)

( * ) Notice: Subject to any disclaimer, the term of this patent is extended or adjusted under 35 U.S.C. 154(b) by 891 days.

(21) Appl. No.: 11/011,696

(22) Filed: Dec. 14, 2004

Related U.S. Application Data

(63) Continuation-in-part of application No. 11/011,540, filed on Dec. 13, 2004.

(60) Provisional application No. 60/528,666, filed on Dec. 11, 2003, provisional application No. 60/528,880, filed on Dec. 11, 2003, provisional application No. 60/528,735, filed on Dec. 11, 2003.

(51) Int. Cl.
*G06K 9/00* (2006.01)
*H04N 7/18* (2006.01)

(52) U.S. Cl. .................. 382/107; 348/154; 348/155
(58) Field of Classification Search ............... 382/103, 382/107, 236; 348/14.1, 97, 154, 155, 208.4, 348/208.13, 208.16, 220.1, 352, 407.1, 451, 348/452, 620, 669, 700
See application file for complete search history.

(56) References Cited

U.S. PATENT DOCUMENTS

| | | | | |
|---|---|---|---|---|
| 5,479,526 A | * | 12/1995 | Benton et al. | 382/103 |
| 5,969,755 A | * | 10/1999 | Courtney | 348/143 |
| 6,278,466 B1 | * | 8/2001 | Chen | 345/473 |

* cited by examiner

*Primary Examiner*—Abolfazl Tabatabai
(74) *Attorney, Agent, or Firm*—King & Spalding

(57) ABSTRACT

A system and method for measuring, animating, and analyzing motion in real-time is provided which operates with or without markers. System variables are used with a motion model to restrict the number of possible locations of a subject. The system variables are based on known or detected relationships between the motions of the various elements of the model. Visual comparisons and quantitative comparisons provide feedback and help a subject learn or improve a motor skill.

32 Claims, 34 Drawing Sheets

SYSTEM AND METHOD FOR MOTION CAPTURE

RELATED APPLICATION

This application is a Continuation-In-Part of U.S. application Ser. No. 11/011,540 entitled "Method for Capturing, Measuring and Analyzing Motion" filed Dec. 13, 2004, which is incorporated herein by reference and which claims priority to U.S. Provisional Application No. 60/528,666 entitled "System and Method for Motion Capture," U.S. Provisional Application No. 60/528,880 entitled "System and Method for Measuring, Animating and Analyzing Motion," and U.S. Provisional Application No. 60/528,735 entitled "Camera for Measuring, Animating and Analyzing Motion," all of which were filed Dec. 11, 2003 and all of which are incorporated herein by reference.

TECHNICAL FIELD

The present invention is directed in general to providing a system and method for capturing and analyzing motion, and in particular to restricting the number of possible locations of a subject so that motion is captured and analyzed more efficiently, providing motion comparisons, and detecting motion without the use of markers.

BACKGROUND

Motion capture systems provide the ability to measure and analyze the motion of humans, animals, and mechanical devices. Once the motion is captured, it can be used for a variety of purposes. For example, the captured motion can be used to animate a computer-generated model of the subject so that the subject's motion can be analyzed or the motion can be used to animate a character created for a motion picture.

Ideally, a motion capture system captures the subject's motion without interfering with the subject's motion, analyzes the captured motion in real-time, and provides an accurate representation of the motion. However, current systems do not provide the real-time performance and accuracy demanded by many applications. Several currently available motion capture systems place markers on or near a subject's joints and then use small groups of markers to determine the position and orientation of the subject. One disadvantage of these types of systems is that the limitation on the position and number of the markers leads to accuracy problems. Another disadvantage is that the markers can interfere with the subject's motion.

Some currently available systems can provide accurate motion capture, but not in real-time. Those systems that provide real-time performance typically sacrifice accuracy or limit the type or scope of motion that can be analyzed. Thus, there is a need for a motion capture system that can accurately capture motion in real-time.

SUMMARY OF THE INVENTION

The present invention meets the needs described above by providing a motion capture system that can measure, animate, and analyze the motion of humans, animals, and mechanical devices in real-time. If markers are used, the system does not require specific locations for the markers. Any number and any locations can be used, so long as the system variables can be determined. The system variables address known or detected relationships between the motions of various elements of the model. System variable rules can be configured to restrict the possible positions of the elements. The rules are applied when certain predetermined conditions are satisfied. Because the rules limit the number of possible positions for the model, the motion capture can be performed more quickly and efficiently.

The system can create a virtual training environment where a stored motion of an individual performing the desired movement is used as the target motion for the subject to literally "step into". This instantaneous feedback permits the subject to "feel" the exact motion required to learn a specific task, and is one of the most effective methods to learn and understand a desired task or activity. The motions can be viewed from any angle in 3D, and subjects can see themselves move in real-time using video displays or head mounted display units. In addition to this real-time visual feedback, real-time performance data is also simultaneously displayed as the subject moves, providing real-time diagnostics of the subject's motions.

The motion capture system supports a variety of applications, including sports performance evaluation, biomechanics research, worker training, etc. For training and performance improvement applications a new motion can be "engineered" for the subject with our motion editing and simulation software. A very user-friendly interface not only allows the user to modify a single motion or multiple motions simultaneously, but also supports the blending and transitioning of one motion into another. This permits the trainer or coach to prescribe a correct movement for the subject to "step into", allowing the subject to then replicate such motion until the move has been perfected.

During motion capture, a captured image is compared to a threshold image on a pixel-by-pixel basis to locate hot pixels. Once the hot pixels are located, the pixels are analyzed to locate connected hot pixels (segments) and connected segments (globs). If the characteristics of the globs satisfy the characteristics of the markers (or the subject in a markerless capture), then the globs are selected for further analysis. The 3D locations for the candidate points corresponding to the selected globs are determined and are used to track the positions of the candidate points between frames. The track attributes for the candidate points are compared to the expected attributes of the subject's motion and if there is a correlation, then the candidate points are used to define an area of interest. A Hough transform is performed on the area of interest and glob detection is performed on the Hough image. The detected globs are further processed using triangulation and considerations of known characteristics to identify the subject. In this manner, the invention provides markerless motion capture. Markerless motion capture expands the application of the invention to situations, such as security or surveillance, where subjects are not fitted with markers.

These and other aspects, features and advantages of the present invention may be more clearly understood and appreciated from a review of the following detailed description of the disclosed embodiments and by reference to the appended drawings and claims.

DETAILED DESCRIPTION

The present invention provides a system and method for measuring, animating, and analyzing the motion of humans, animals, and mechanical devices in real-time. Briefly described, the present invention uses cameras to capture the movement of a subject. In one embodiment, markers are placed on the subject, while in another embodiment markers are not used. The measured data obtained from the cameras is compared to a motion model that predicts the possible positions of the subject to determine the captured motion. The motion model uses system variables to address known or detected relationships between the motions of various elements of the model. System variable rules can be configured to restrict the possible positions of the elements. The rules are applied when certain predetermined conditions are satisfied. Because the rules limit the number of possible positions for the model, the motion capture can be performed more quickly and efficiently.

The model can be used to provide feedback to the subject by displaying a computer-generated image of the subject performing the motion. In one embodiment, the subject's image is compared to an expert's image so the subject can compare its movement to that of an expert. The comparison can be performed in real-time so that the subject can try to match the movement of the expert. In addition to providing a visual comparison, quantitative feedback that measures the differences in position, orientation and/or rate of movement can be provided.

The invention also supports markerless motion capture. A Hough transform is performed on an area of interest and glob detection is performed on the Hough image. The detected globs are further processed using triangulation and considerations of known characteristics to identify the subject.

The Model

The system uses a computer-generated polygonal model representing the subject. The model can include texture mapping and other advanced graphical features. If the motion of interest includes multiple objects or subjects, then multiple models can be combined. For example, a model of a human can be combined with a model of a wheelchair to analyze the movement of a subject using a wheelchair.

Figure 1B:
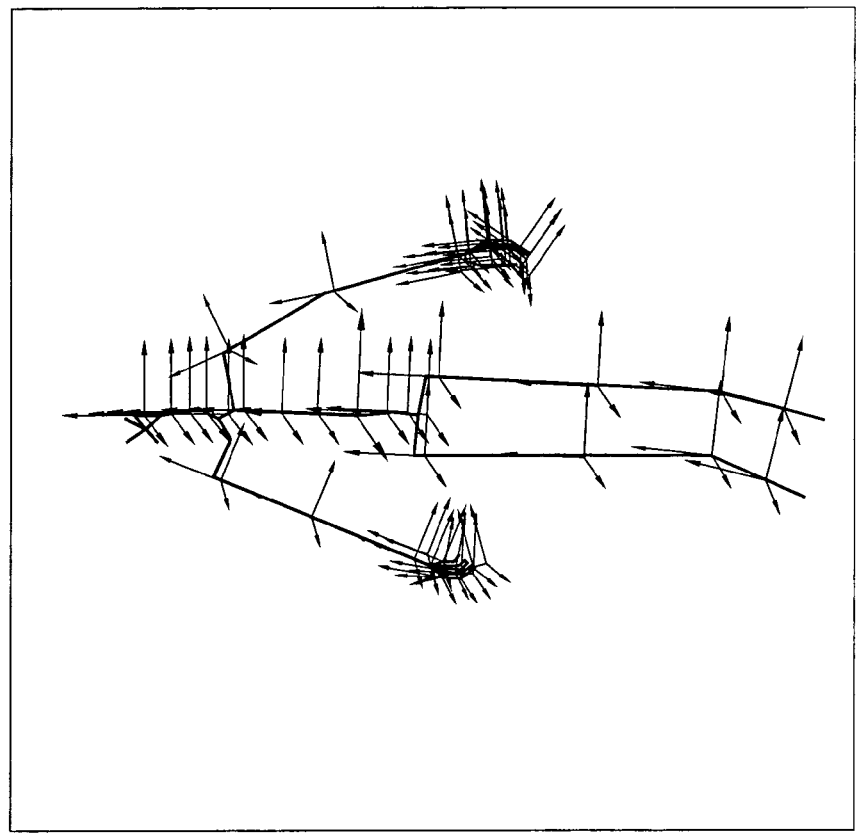
FIG. 1B illustrates coordinates for the elements shown in FIG. 1A in accordance with an embodiment of the invention.
Figure 1A:
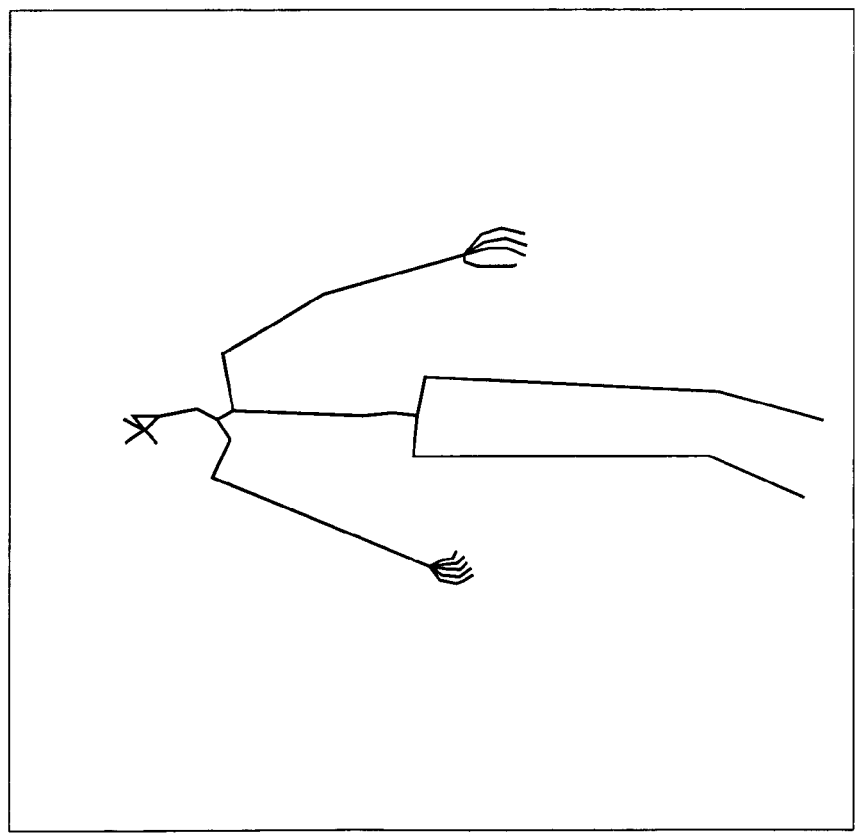
FIG. 1A illustrates elements of a model in accordance with an embodiment of the invention.

The graphical model is represented by a number of elements that can move relative to one another or to an absolute reference point. Each element is assigned a parent element, an origin, and a coordinate system. The motion of an element is defined relative to its parent. The origin and coordinate system for an element are defined to provide maximum consistency with the underlying nature or anatomy of the subject. FIG. 1A illustrates the elements of an exemplary model. The elements shown in FIG. 1A form a "skeleton," although the skeleton does not include all of the bones present in a normal human skeleton. FIG. 1B illustrates the coordinate systems for the elements.

The elements of the model are scaled so that the model reflects the actual size of the subject. Elements may be scaled independently or scaled identically. For example, each leg can be scaled independently or the legs can be scaled identically. In one embodiment, additional markers are used for scaling.

Just as the motion of all of the underlying bones impacts the motion of the human skin near a joint, the position of a particular point on the model can be affected by multiple elements. This ensures the continuity of locations across elements near joints and the continuity of surface normals near joints.

The model is configured based on the type of motion to be captured and analyzed. For example, the model may be configured to allow relative movement between each of the various finger segments of each finger to capture the finger movements of a violinist. However, relative movements of the finger segments may not be necessary for another model that is used to analyze a baseball player swinging a baseball bat. The elements of the model vary from fully constrained (no motion) to full motion (six-degrees of freedom) having both translational and rotational degrees of freedom. The motion between any two elements can be defined to include any number of degrees of freedom (0 to 6), and the sequence of relative movements can also be defined. For example, motion can be defined as a rotation about a parent Y-axis followed by a rotation about a Z-axis.

The system supports relationships between the motions of various elements. For example, if the motion of individual finger segments is important, then each element corresponding to a finger segment is allowed at least one rotational movement relative to its parent element. However, in many applications (and in many people), these relative movements cannot be controlled independently. In many movements there is a predictable relationship between the relative motion of multiple segments. For example, the lower spinal segments can be used to predict the relative motion of the upper spinal segments in many situations. The system uses system variables to handle relative motion. The relative motion at any joint between elements can be defined to be equal to the value of a given system variable, or equal to any linear combination of system variables (including a constant offset), or set to a constant. This significantly enhances the capability of the system.

The user selects the number of system variables to use and defines how the motions of the elements correspond to the system variables. Limits can be placed on the ranges of any or all system variables. A system variable can be specified as unrestricted, limited above, limited below, or limited both above and below. Typically elements that may move freely relative to the ground, such as a ball, are unlimited, whereas elements whose relative movement is restricted, such as the movement of the lower leg relative to the upper leg are limited.

System variables can also be used to accommodate non-rigid movements, such as the movement of human skin. For example, a system variable can be used for differential stretching along the length of an element (like a spring) or differential axial rotation along the length of an element. The system variables control the extent of the deformation by controlling the possible directions and magnitudes of the motion relative to other elements.

There are no restrictions on the number or locations of the markers so long as the markers are sufficient to determine the system variables. The system considers the locations of all of the markers to determine the locations of each of the elements. Thus, small random errors associated with the determination of individual marker positions do not significantly degrade the accuracy or the determination of the position and orientation of any system element. Based upon the marker data and the motion model, the system uses an optimization problem or scheme to determine the most probable configuration of the subject.

The Motion Capture Environment

The system uses a number of high-speed cameras to capture information about the locations of the markers (or the location of the subject in a markerless embodiment) as the subject moves. The cameras support high-speed image capture, as well as high-speed image processing. The cameras are connected to each other, as well as to a central computer.

The cameras are synchronized so that their shutters open simultaneously. The shutter open time is variable and typically ranges from $1/1000$ to $1/4000$ of a second depending upon the speed of the motion to be captured. The shutters can be triggered by a signal from the central computer or can be triggered using a synchronized clock signal within each camera. The frame rate is based on the motion to be captured and can be constant throughout the motion capture or can vary. For example, if a golf swing is being captured, the frame rate may be higher around the point of impact. A frame rate of 2000 frames per second could be used for the 10 frames before and the 10 frames after the club impacts the ball, and a frame rate of 200 frames per second could be used for the remaining frames.

A spotlight is attached to each camera and is aligned with the camera's line of sight so that the highly reflective material used for the markers appears very bright in the camera image. The images from the cameras are digitized and the brightness of each pixel is determined in order to identify bright regions in the image. The locations of the bright regions, as well as other characteristics of the regions are used to determine the locations of the markers.

Typically, the cameras are placed around the room. Each camera determines 2D coordinates for each marker that it sees. The coordinate information for each marker from the cameras is calibrated so that the 2D coordinates are transformed into 3D coordinates. The cameras can be calibrated by moving a single marker throughout the motion capture area. Alternatively, the cameras can be calibrated by moving multiple wands having a small number of markers throughout the motion capture area. The fixed relative positions of the markers on the wand are used by the calibration process to quickly calibrate the cameras. As the subject moves, the cameras capture the motion and provide marker data, which describes the location of the markers in the 3D space.

Motion Capture Using Markers

In one embodiment, lightweight, highly reflective markers are attached to the subject and other items of interest, such as bats, clubs, etc. The locations of the markers are defined by identifying the element associated with the marker, as well as the approximate location of the marker relative to the element. The location of each marker is measured by associating bright spots in the camera images with the markers in real-time. An auction-algorithm assignment scheme is used at the camera level. An array of anticipated marker locations is generated based on camera coordinates and the 3D coordinates of the markers in previous frames. An assignment based on minimizing the sum of the distances between the predicted camera locations and the assigned measured location is performed. This assignment reflects the characteristics of the marker, such as movement, speed and predictability. This assignment is performed iteratively, using a preliminary assignment at the camera level to generate 3D locations. Depending upon the quality and consistency of the 3D locations, the camera level assignments can be repeated.

The system determines the subject's motion by solving an optimization problem based on the measured marker data and an initial estimate of the configuration of the subject. The optimization process determines the most probable configuration, i.e. collection of system variable values that determines the position and orientation of every element in the model, which minimizes the root mean square error between the predicted and measured marker locations. The predicted marker location is determined by predicting a position for the marker based on the marker's local coordinates (relative to the element to which it is attached) and the current position and orientation of the element to which it is attached based upon the system variable values. The measured marker location is determined from the captured images.

The optimization process considers the effects of any system variable restrictions and any additional markers, such as artificial pairs. An artificial pair is a pair of imaginary markers where each artificial marker is associated with a separate element. Marker data is used even if the marker is seen only in one camera. Although the 3D location of the marker is unknown, the line of sight is known, so the configuration is adjusted to keep the predicted location of that marker as close as possible to that line of sight. The optimization process uses a penalty approach to define an equivalent unconstrained problem. A Fletcher-Powell based method is used with a cubic interpolation one-dimensional search. This converges to the optimal solution very rapidly, allowing the process to be implemented in real-time.

The optimization problem is solved for each frame. For each frame, the initial estimate of the configuration of the subject is the calculated configuration from the previous frame and the cameras capture the marker data. In the prior art systems, the optimization problem is static. However, the present invention implements a dynamic optimization problem that can change frame by frame so that it can be solved more efficiently.

System Variables

The attributes of the system variables can be dynamically defined based on the current motion capture and/or a priori knowledge of the motion to be captured. The position, velocity, and acceleration history of the current motion capture or certain attributes of the motion to be captured can be used to define the system variables. For example, during a golf swing the club head moves in a roughly circular path with an increasing velocity as it moves downward toward the ball. By using the results of the analysis of preceding frames, it can be determined when the club head begins its downward movement. Once it begins its downward movement, then there are constraints that can be inferred about the position of the club head. These constraints can be used to modify the optimization problem by defining one or more system variable attributes.

System variable attributes are defined using a rule that specifies the modification to the optimization problem, including any necessary parameters or values, as well as the conditions under which the rule is applied. An exemplary rule is shown below. The rule is a "Set Sysvar Select" rule that specifies that system variable #117 is assigned the value 0 beginning with frame #15.

RULE=SET_SYSVAR_SELECT(117, 0)^
APPLY=frameCountIs(15,*)

The rules are read into the system and the appropriate structures are setup as the model and the initial problem definition are prepared. Before each frame is captured, the "Apply" expression for each rule is evaluated to determine whether the conditions are satisfied. If the conditions are satisfied, then the rule is applied for the frame. The conditions for applying the rule, as well as the value of the system variable can be either a static value, either predetermined or dynamically determined, or a function.

Figure 2:
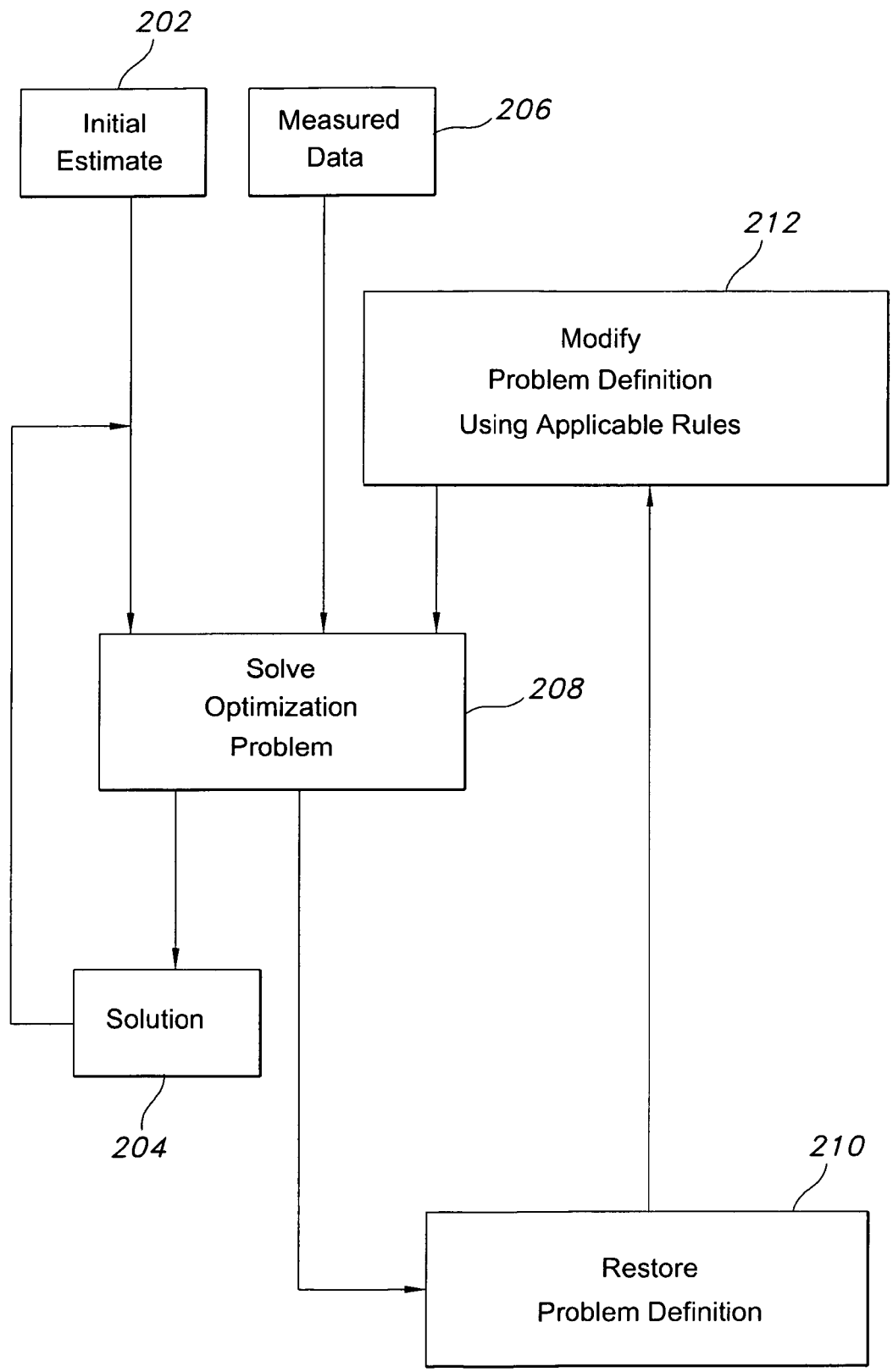
FIG. 2 illustrates the dynamic modification of the optimization problem in accordance with an embodiment of the invention.

FIG. 2 illustrates the dynamic modification of the optimization problem via rule application. For each frame the rules are evaluated to determine whether any of the rules should be applied to modify the optimization problem, block 212. The optimization problem, modified if applicable by one or more rules is solved, block 212, using the initial estimate 202 for the first frame or the prior frame solution 204 for a subsequent frame and the measured data 206 obtained from the cameras. Once the optimization problem is solved for the frame, the optimization problem is restored to its original state, block 210. This process is repeated for each frame.

Exemplary System Variable Rules

The following sections describe exemplary rules that affect the optimization problem. In particular, the rules describe limiting the possible positions of the subject, which accelerates the solution of the optimization problem.

Set Sysvar Select

The "Set Sysvar Select" rule includes a system variable ID number and a value. The rule sets the specified system variable to a particular value. This is useful when the orientation and position of part of the subject is known. For example, the position and orientation of the hands and fingers of a golfer during a golf swing can be set to a constant since the analysis of the swing may be primarily concerned with the movement of the golfer's arms and the club. While the subject is getting ready to swing, the system variables corresponding to the hands and fingers can be calculated normally. However, once the swing starts, the system variables corresponding to the hands and fingers can be set to a constant. In this manner, the system variables corresponding to the hands and fingers are set to a constant regardless of the captured motion.

Set Sysvar

The "Set Sysvar" rule includes a system variable ID number, a value and a variance. The rule limits the system variable to the specified value, plus or minus the specified variance. This is useful when it is known that the orientation and position of a part of the subject is limited to a certain range. Since the value and the variance can be either a static value or a function, this rule can greatly simplify the optimization problem. For example, if markers are placed on the grip and the club head of a golf club and kinematic information describing the flex of the club is known, then the Set Sysvar rule can be used if some of the markers are obstructed. If the markers on the grip are visible, but the markers on the club head are obstructed, then the system variables corresponding to the club head are restricted to the range of values deemed possible based on the position of the markers on the grip and the kinematic information for the club. This is accomplished by setting the Apply condition to a function that is satisfied if the markers on the club head are obstructed, the markers on the grip are visible and kinematic information for the club is known. The value and the variance of the system variable can also be a function that is based on the kinematic information for the club and the current motion capture.

Clamp Down Sysvar

The "Clamp Down Sysvar" rule specifies a system variable ID and a limit. The rule limits the system variable to a value that is dynamically determined. The value of the system variable is determined the first time that this rule is applied. For subsequent applications of the rule, the system variable is restricted to the value, plus or minus the limit. If the limit is defined as zero, then the system variable is held constant after the first time the rule is applied. Unlike the Set Sysvar rule, the system variable of the Clamp Down Sysvar rule is not set to a predetermined value. The system variable is calculated freely until the first time that the Clamp Down Sysvar rule is applied. After the rule is applied, the value of the system variable is clamped down to that value, plus or minus the limit.

This rule is useful if a part of the subject moves very little or not at all once a certain position is reached. For example, if the subject is performing chin-ups, then once the subject grasps the chin-up bar, the subject does not release the chin-up bar until the chip-ups are completed. The Clamp Down Sysvar rule could be applied to the system variables corresponding to the hands once the subject begins the first chin-up. The limit of the rule is selected to restrict the possible movement of the hands. Another example of an application of the Clamp Down Sysvar rule is the motion of the arms of a subject performing chin-ups. Once the first chin-up is started, the rotation of the arms can be limited since the subject's arms will not rotate through the full 360-degrees that are normally allowed for motion capture.

Set Art Pairs

The "Set Art Pairs" rule specifies two artificial markers associated with separate elements and an optional criteria. If a criteria is specified, then the elements maintain the same relative position until the criteria is satisfied. If a criteria is not specified, then the elements maintain the same relative position throughout the motion capture. An artificial marker is an imaginary marker and does not necessarily correspond to an actual marker.

This rule is useful for describing motion where there is a known relationship between the elements, such as a golfer swinging a golf club or a baseball player swinging a baseball bat. The rule reflects a priori knowledge of the motion, such as the knowledge that the golfer will hold onto the golf club with both hands throughout the swing or that the baseball player will hold onto the baseball bat with both hands throughout a portion of the swing.

In the case of the golfer, the rule specifies an artificial marker that corresponds to the golfer's right hand and an artificial marker that corresponds to the club. Another artificial pair is specified that corresponds to the golfer's left hand and the club. If no criteria is specified, then the system keeps the hands on the club throughout the motion capture.

In the case of the baseball player, the rule specifies an artificial marker that corresponds to the baseball player's right hand and an artificial marker that corresponds to the bat. Another artificial pair is specified that corresponds to the baseball player's left hand and the bat. If the baseball player is right handed, then it is known that at some point in the swing the player will release the bat from the right hand while continuing to hold onto the bat with the left hand. To accommodate this relationship between the hands and the bat, criteria can be specified for the artificial pair that includes the right hand and the bat so that once the distance between the right hand and the bat exceed a certain distance, then the artificial pair will be suppressed or turned off. The rule for the artificial pair for the left hand and the bat may not include criteria since the left hand holds onto the bat throughout the swing.

Motion Comparison

Once the system variables are determined, the system can animate the graphical model to display the captured motion. The display is available during the motion capture, as well as afterwards. The graphical model for one subject, e.g. a student, can be compared to a graphical model for another subject, e.g. an expert, so that any differences in position, orientation or rate of movement can be displayed. Before the comparisons are performed the models for the two subjects are scaled so that the differences are based on differences in position and orientation, rather than based on differences in the size of the two subjects. In addition to the feedback provided by the comparison of the two graphical models, the student is also provided with quantitative feedback that describes the differences between the student's and the expert's body positions. The feedback assists the student in learning or improving a motor task.

Figure 3:
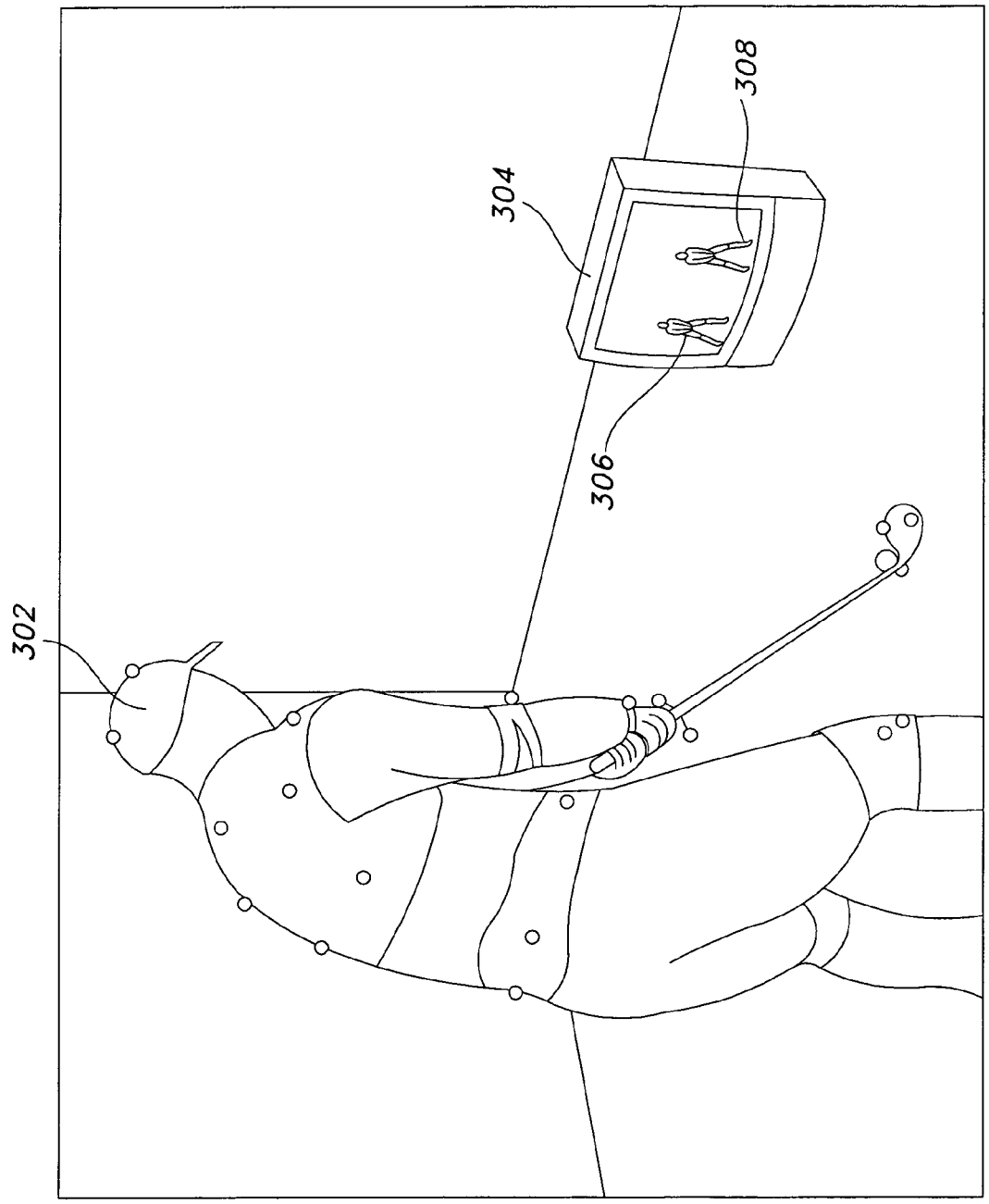
FIG. 3 illustrates graphical model comparison feedback in accordance with an embodiment of the invention.

For example, a golf student can compare swings with the swing of an expert that was previously captured. The golf student can adjust his or her body positions to match the positions of the expert at different points in the swing. FIG. 3 illustrates a golf student 302 with markers placed on the golfer's body and the golf club. A display 304 is visible to the student and compares a graphical model for the student 306 side by side with a graphical model for an expert 308. The student can practice positioning himself into the expert's image at various key points throughout the swing.

Figure 4A:
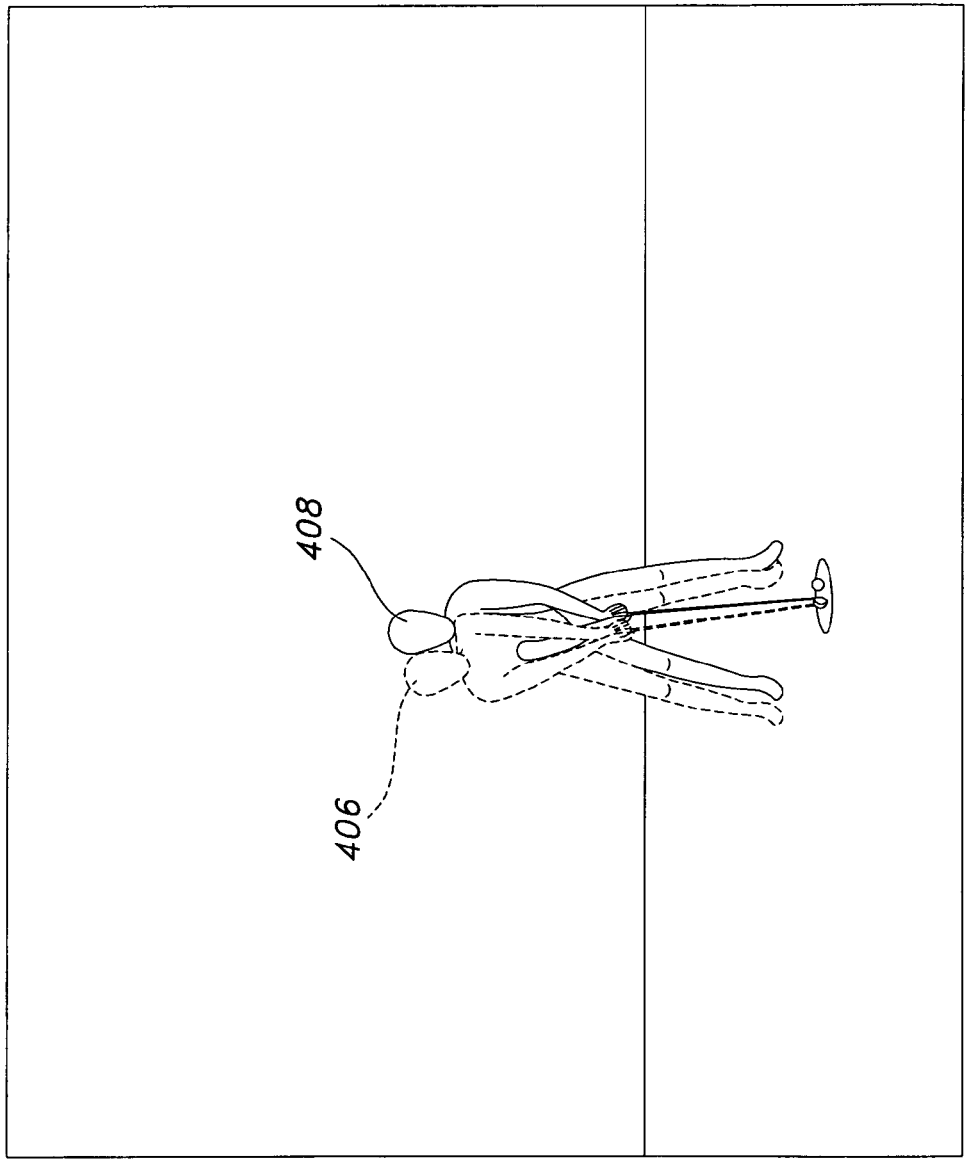
FIGS. 4A and 4B illustrate graphical model comparison feedback in accordance with an embodiment of the invention.
Figure 4B:
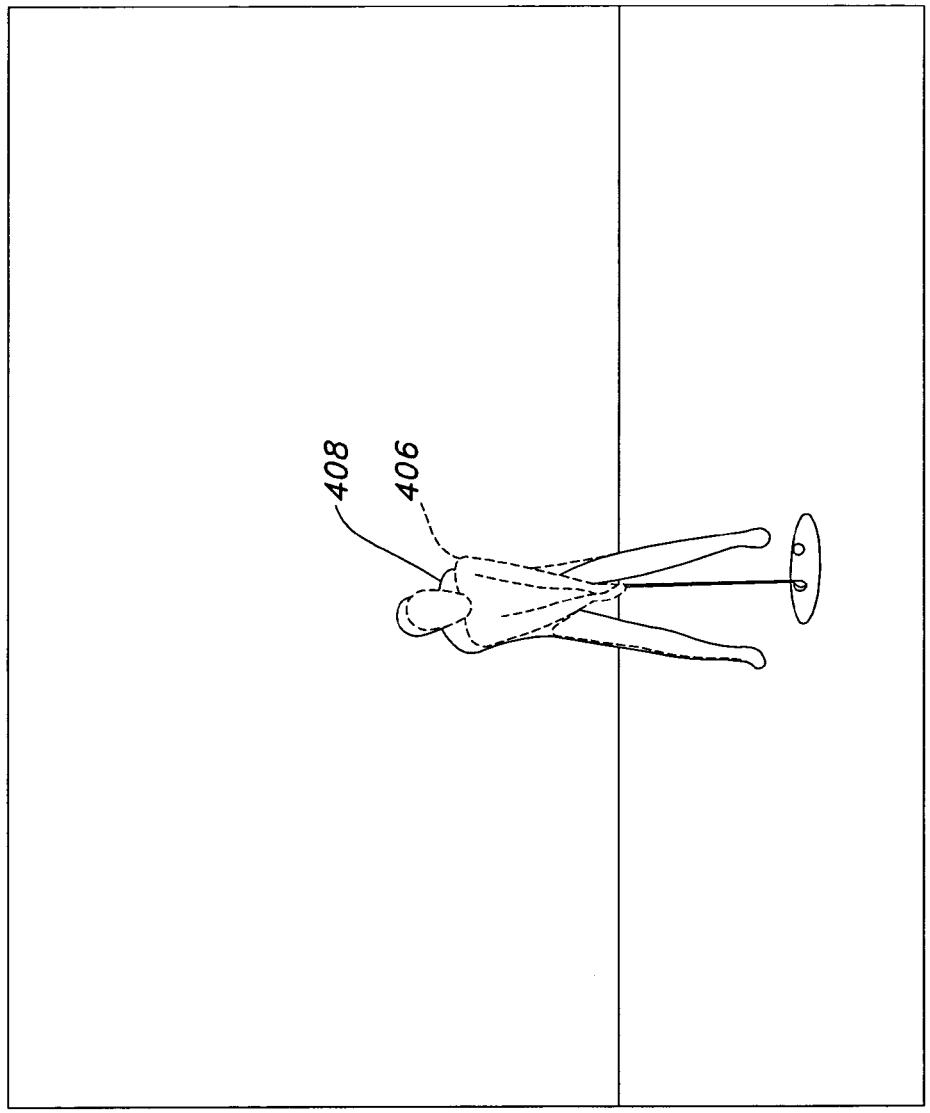

Alternatively, the comparison between the student and the expert can be shown by superimposing the graphical model for the student over the graphical model for the expert as shown in FIGS. 4A and 4B. In FIG. 4A, the differences in position between the graphical model for the student 406 and the graphical model for the expert 408 are shown on the display. FIG. 4B illustrates that the student has adjusted his position to match the expert's position. The graphical models can be viewed and compared from any angle or viewpoint.

In addition to the visual comparisons, the system provides numerical or quantifiable difference indicators. Exemplary types of differences that can be calculated are shown in Table 1 below.

TABLE 1

| Difference Indicator | Definition |
| --- | --- |
| Global Position | Position of body segment relative to a global reference |
| Relative Position | Position of body segment relative to another body segment |
| Relative Distance | Distance between two body segments |

TABLE 1-continued

| Difference Indicator | Definition |
| --- | --- |
| Global Orientation | Orientation of body segment relative to global reference |
| Projected Included Angle | Angle formed between two bodies, either 2D or 3D angle |
| Relative Rate | Velocity of body segment relative to another body or to global reference |

Integration techniques can be used to calculate the amount of overlapping volume between two bodies or segments. As discussed above, the graphical model includes a number of elements that represent the interconnected segments of the subject, as well as layers of polygons to provide bulk and volume. The elements represent the skeleton of the model and the polygons represent the skin of the model. The volume calculation defines the volume of a segment as the volume contained within the skin of the graphical model for the element that corresponds to the segment.

Alternatively, an estimate of the positional differences can be determined by comparing a line between the end points of a body segment. The line calculation defines the position of a segment as the position of the element that corresponds to the segment. This estimate is less computationally intense than the overlapping volume calculation so it is typically used for real-time comparisons. However, as processing speeds increase, it may be possible to calculate overlapping volumes in real-time.

The volume or line comparisons can be performed for the entire body or for certain selected body segments. A configuration file is used to define the comparison by specifying the scope of the comparison by specifying parameters, such as those shown in Table 1. The quantified feedback is provided to the student via a display and can use any type of graphics, including graphs, charts, scores, colors or any other type of indicator. The configuration file also can be used to weight the comparison of certain segments. For example, if the student is learning to perform a wheelchair transfer, then the segments corresponding to the upper body may be given more weight than the segments corresponding to the lower body. If so, then relatively small differences in hand placement or arm placement will result in a significant difference in the feedback indicator.

Figure 5A:
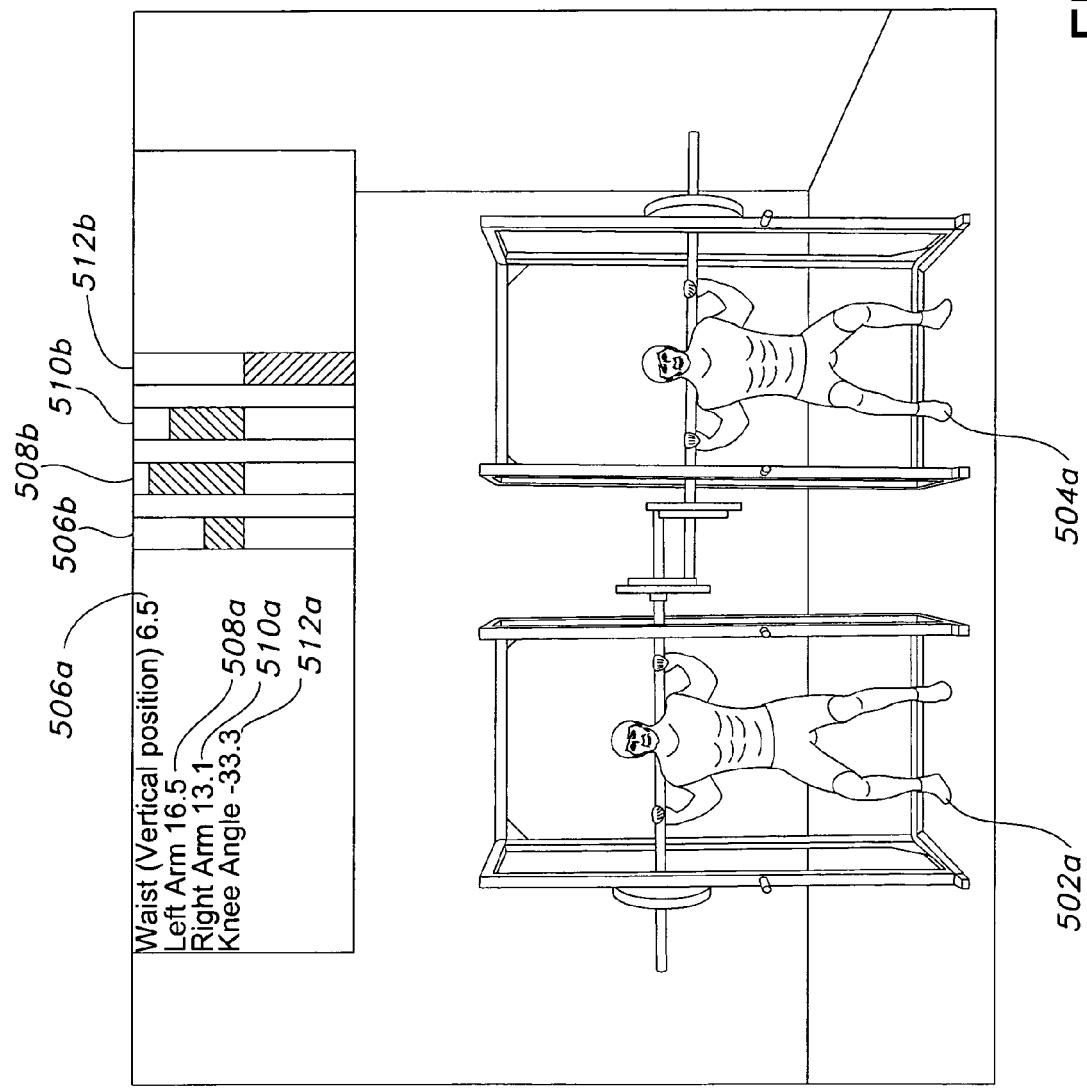
FIGS. 5A, 5B and 5C illustrate graphical model comparison feedback and quantitative feedback in accordance with an embodiment of the invention.
Figure 5B:
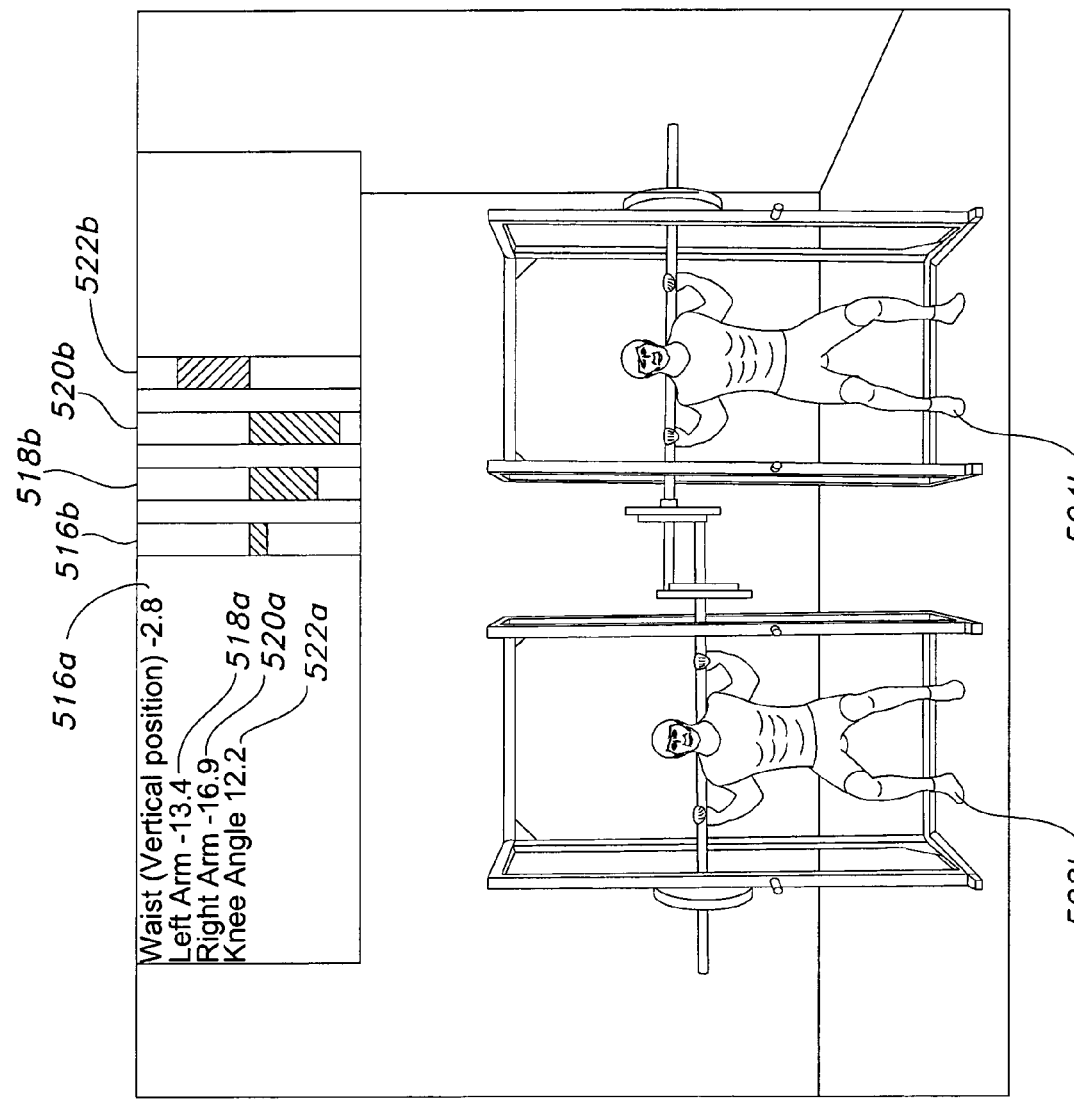
Figure 5C:
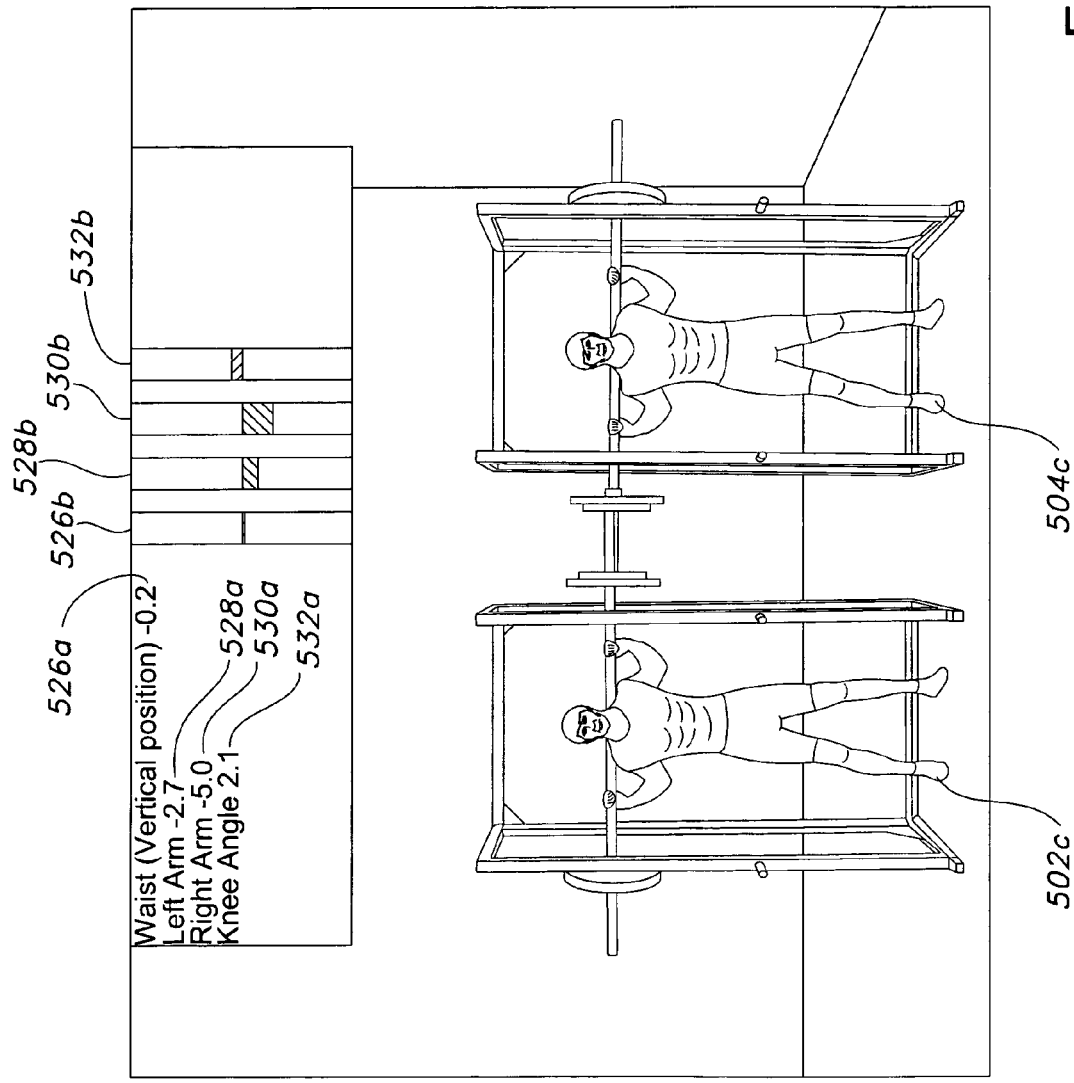

FIGS. 5A, 5B and 5C illustrate a combined display that provides both graphical model feedback and quantitative feedback. The graphical model of the student 502 is shown alongside the graphical model for the expert 504. The quantitative feedback is focused on the vertical position of the waist and arms and the supplementary angle between the lower leg segment and the upper leg segment. The feedback includes a numerical difference 506a, 508a, 510a, 512a, and a corresponding bar graph 506b, 508b, 510b, 512b. A positive difference number or a bar extending upwards indicates that the student's vertical position is higher than the expert's vertical position or the supplementary angle for the student is greater that the supplementary angle for the expert. A negative difference number or a bar extending downwards indicates that the student's vertical position is lower than the expert's vertical position or the supplementary angle for the student is less than the supplementary angle for the expert. In FIG. 5A the student's position is higher than the expert's position and in FIG. 5B, the student's position is lower than the expert's position. In FIG. 5C the student's position closely matches the expert's position.

Motion Capture

Figure 6:
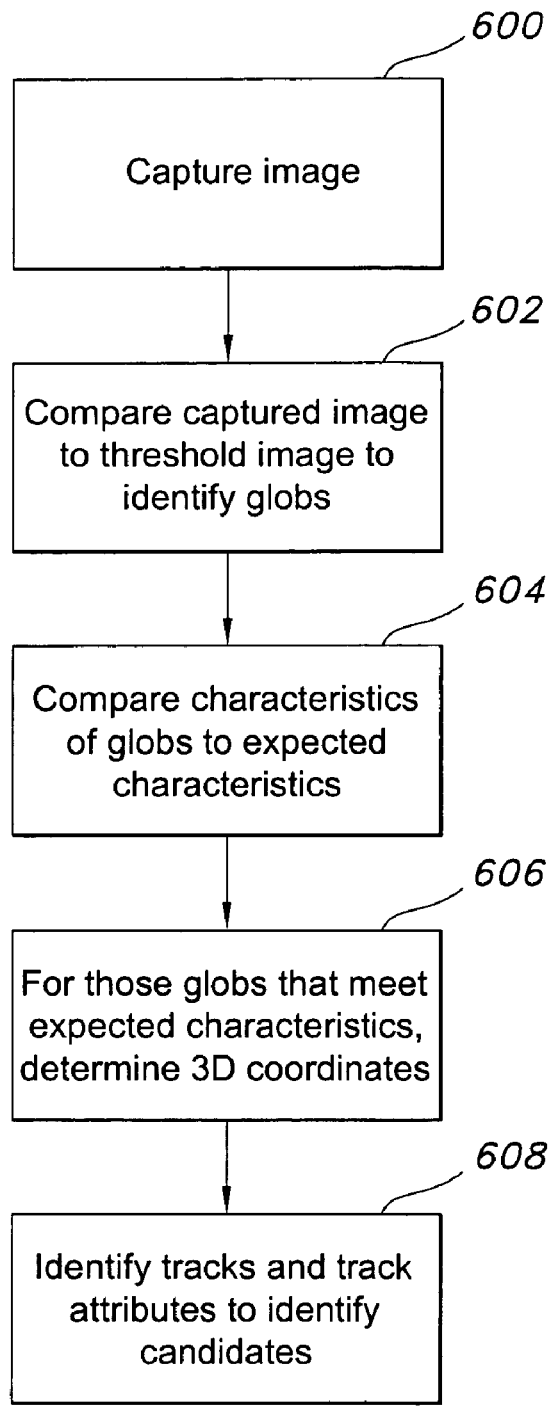
FIG. 6 is a flow diagram illustrating a method for motion capture in accordance with an embodiment of the invention.

To capture the motion of a subject, the cameras capture a series of images. The images are processed to identify the locations of the subject from frame to frame. FIG. 6 illustrates the processing of the captured images. In step 600, each camera captures an image. Each captured image is compared to a threshold image to detect globs, in step 602. Once the globs are detected, the globs are evaluated to determine whether the characteristics of the globs satisfy certain predetermined characteristics, in step 604. If so, then the 3D coordinates for the candidate points corresponding to the globs are calculated using information from all of the cameras in step 606. In step 608, the relative locations of the candidate points are evaluated across frames to identify a track and track attributes in order to identify a candidate for further analysis. In one embodiment, steps 600-604 are performed on the cameras and steps 606-608 are performed on the central computer. However, as the cameras become more powerful, more of the processing will be performed on the cameras. Additional details of the steps are provided below. Additional details of these steps also are provided in U.S. patent application Ser. No. 11/011,540 entitled "Method for Capturing, Measuring and Analyzing Motion," which is incorporated herein by reference.

Glob Detection

Each image captured by the camera is compared to the threshold image on a pixel-by-pixel basis. The intensity of each pixel of the captured image is compared to the intensity of the pixels of the threshold image. If the intensity of the pixel of the captured image is greater than the intensity of the pixel of the threshold image, then the pixel is marked as a hot pixel. Once all of the pixels are compared, the information is used to generate an RLE (run length encoding). The RLE is a method of describing the locations of all the hot pixels in the captured image. The RLE is a collection of segments, where a segment is defined as a single hot pixel or a series of connected hot pixels on a line. The RLE is stored in such a manner that a line number and the beginning and ending pixels of a segment on the line are encoded together with an index for each segment.

Each line that includes any hot pixels is encoded using a number of shorts (two bytes). The first short corresponds to the line number and the second short corresponds to the number of hot segments in the line. For each hot segment, additional shorts are used to identify the hot segments. The first short is the first hot pixel in the segment, the second short is the last hot pixel in the segment and the third short is the segment index. Shown below is an example.

| Threshold Image | 01 | 02 | 04 | 06 | 06 | 04 | 05 | 06 | 06 | 02 | 50 | 80 | 80 |
|---|---|---|---|---|---|---|---|---|---|---|---|---|---|
| Captured Image | 00 | 01 | 04 | 16 | 20 | 14 | 06 | 04 | 01 | 00 | 60 | 65 | 68 |
| Hot/Cold | C | C | C | H | H | H | H | C | C | C | H | C | C |

The first line of the example shown above represents the pixel intensity of the threshold image and the second line represents the pixel intensity of the captured image. The third line indicates whether the intensity of the pixel of the captured image is greater than the intensity of the corresponding pixel of the threshold image, i.e. the pixel is hot. Assuming that the above lines correspond to line 50, then the information is encoded as follows.

0050 0002 0003 0006 xxxx 0010 0010 xxxx

The first short represents the line number (0050) and the second short represents the number of hot segments (0002). The third short represents the first hot pixel of the first hot segment (0003), the fourth short represents the last hot pixel of the first hot segment (0006), and the fifth short represents the segment index. The first hot segment is four pixels long and begins at pixel 3 and ends at pixel 6. The sixth short represents the first hot pixel of the second hot segment (0010), the seventh short represents the last hot pixel of the second hot segment (0010), and the eighth short represents the segment index. The second hot segment is one pixel long and begins and ends at pixel 10. Since the segment indexes are not yet defined, they are designated as xxxx.

The segment indexes indicate which hot segments are connected. For example, if a hot segment on line 31 begins at pixel 101 and ends at pixel 105 and a hot segment on line 32 includes any pixel from 101 to 105 inclusive, then the two hot segments are connected and are assigned the same index number. Connected hot segments are referred to herein as globs. Each glob is identified by a single index number that is unique for the frame.

In some circumstances, a single glob may be initially identified as two or more globs. Consider for example a "U" shaped glob. Initially the two legs of the U receive different index numbers. However, when the bottom of the U is processed, it is discovered that the two legs are connected. In this situation, the index numbers are modified so that the U-shaped glob is identified by a single index number.

Glob Discrimination

Once the globs are identified, the globs are compared to the characteristics of the markers (if markers are used) or the subject (if markers are not used). For each glob, the number of hot pixels, a bounding box, a fill factor and the center of gravity are calculated. The bounding box is a regularly shaped area, such as a square, that contains the glob and is used to compare the shape of the glob to the shape of the marker or subject. The fill factor is computed by dividing the area of the glob by the area of the bounding box. In one embodiment, the area of the glob is determined by assuming that the glob is roughly circular in shape and calculating the area of a circle.

The center of gravity can be calculated based on whether the pixels are hot or cold or can be based on the grey-scale levels of the pixels. The center of gravity calculation can consider pixels that are below the threshold, but border a hot pixel. Consider a glob consisting of a single hot pixel located at (100, 100) with bordering intensities as shown below. The threshold intensity for the corresponding threshold image is 50.

|  | 099 | 100 | 101 |
|---|---|---|---|
| 099 | 4 | 4 | 4 |
| 100 | 5 | 60 | 45 |
| 101 | 4 | 10 | 4 |

If only the hot pixel is considered, then the center of gravity is calculated as (100, 100). However, if the bordering pixels are considered, then the center of gravity is calculated as (100.286, 100.043).

The characteristics of the globs are compared to the expected characteristics of the markers or subjects. For example, the size of a glob (number of hot pixels) is compared to the expected size of a marker. If the glob is too small or too big, then it is discarded from further processing. In addition, the shape of the glob (the bounding box of the glob) is compared to the expected shape or proportions of a marker. In one embodiment, if the bounding box is elongated more than a predetermined amount (e.g. width is more than three times height), then the glob is discarded, since the markers are round spheres. In this embodiment, an oblong or elongated bounding box likely results from reflections from shiny surfaces, such as door or window frames.

The fill factor of the glob is also compared to an expected fill factor. In one embodiment, a fill factor of between 40% and 60% is used. The fill factor is used to eliminate globs that are hollow or diagonally elongated. The criteria for size, shape and fill factor are based on the known characteristics of the markers or subject and thus, will differ based on the markers or subject to be captured. Additional criteria may also be used depending upon the characteristics of the marker or subject. If the characteristics of the glob meet the expected characteristics, then the glob is identified for further processing.

3D Location

Glob detection is performed on a frame-by-frame basis for each image generated by each camera. A set of globs, $G_c$, is generated for each frame from each camera. To determine the 3D coordinates for the candidate points corresponding to the globs, a set of 3D rays $R_c$ is constructed from each set of globs. The form of each image ray R is:

$$R = P_R + d * D_R$$

where $P_R$ is the origin of the ray (the camera position).

$D_R$ is the normalized direction of the ray.

d is a distance (to be determined via triangulation) that the point is along the ray.

Triangulation, with a specified error tolerance (typically 0.8) of the rays $R_c$ across all cameras gives a set of 3D points, $M_t$. The points, $M_t$, represent candidate points and areas of interest in the scene. These points are further evaluated based on their relative movement from frame to frame.

Candidate Identification

Over time frames t1, t2, . . . , tn, a sequence of marker sets, $M_{t1}, M_{t2}, \ldots, M_{tn}$, is generated. In a markerless embodiment, the marker sets are sets of points that correspond to the subject, rather than a marker. The relative locations of the marker sets from frame to frame are evaluated to identify tracks and track attributes. For example, a point in one marker set is compared to a point in a subsequent marker set to determine the "closeness" of the positions. If the points are close, then the points may be deemed to be part of the same track and a track number is assigned to the points. The criteria used to evaluate closeness, such as the relative positions from frame to frame, the number of consecutive frames of closeness, the number of frames without closeness, etc., are based on the object or subject that is being captured. Once a track, Ti, is identified, the track is assigned a type, such as car or person, based on the values of the various attributes of the track. The tracks that are assigned a type that corresponds to the object or subject of interest are identified as candidates.

Markerless Motion Capture

In one embodiment, the invention operates without markers. Markers are not suitable for certain applications, where it is impractical or impossible to associate markers with a subject. For example, the present invention can be used to provide security monitoring by monitoring people in a bank. In this embodiment, the system identifies and tracks subjects as they enter the motion capture area. The subjects may not be aware of the monitoring and in any event are not outfitted with markers.

Figure 7:
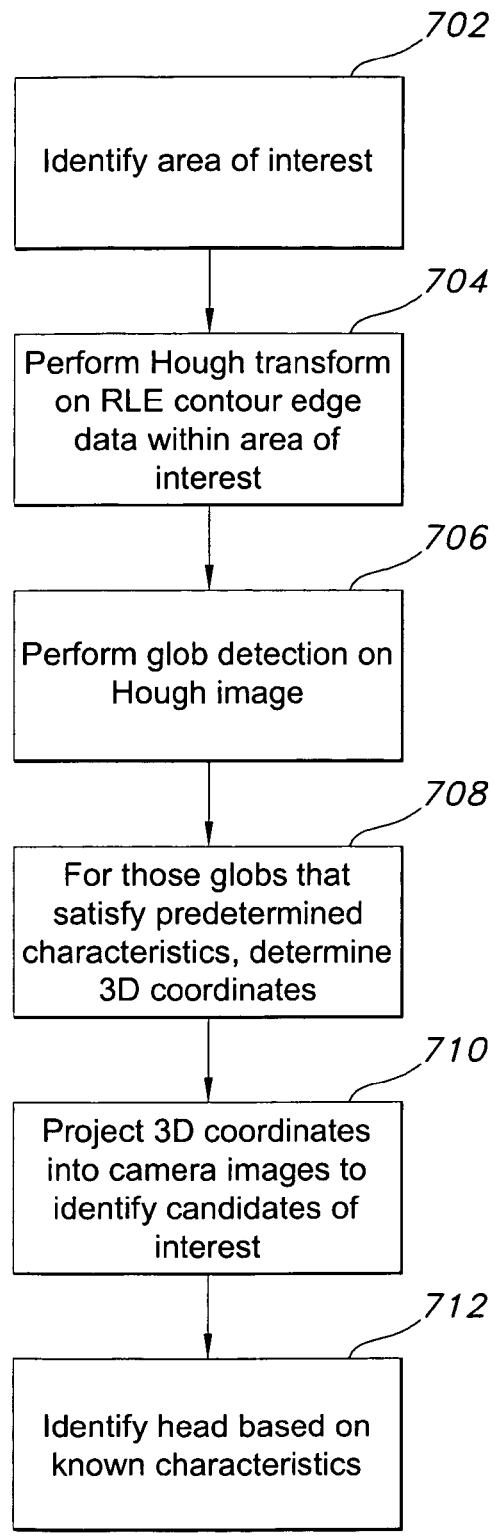
FIG. 7 is a flow diagram illustrating a method for head detection in accordance with an embodiment of the invention.
Figure 8A:
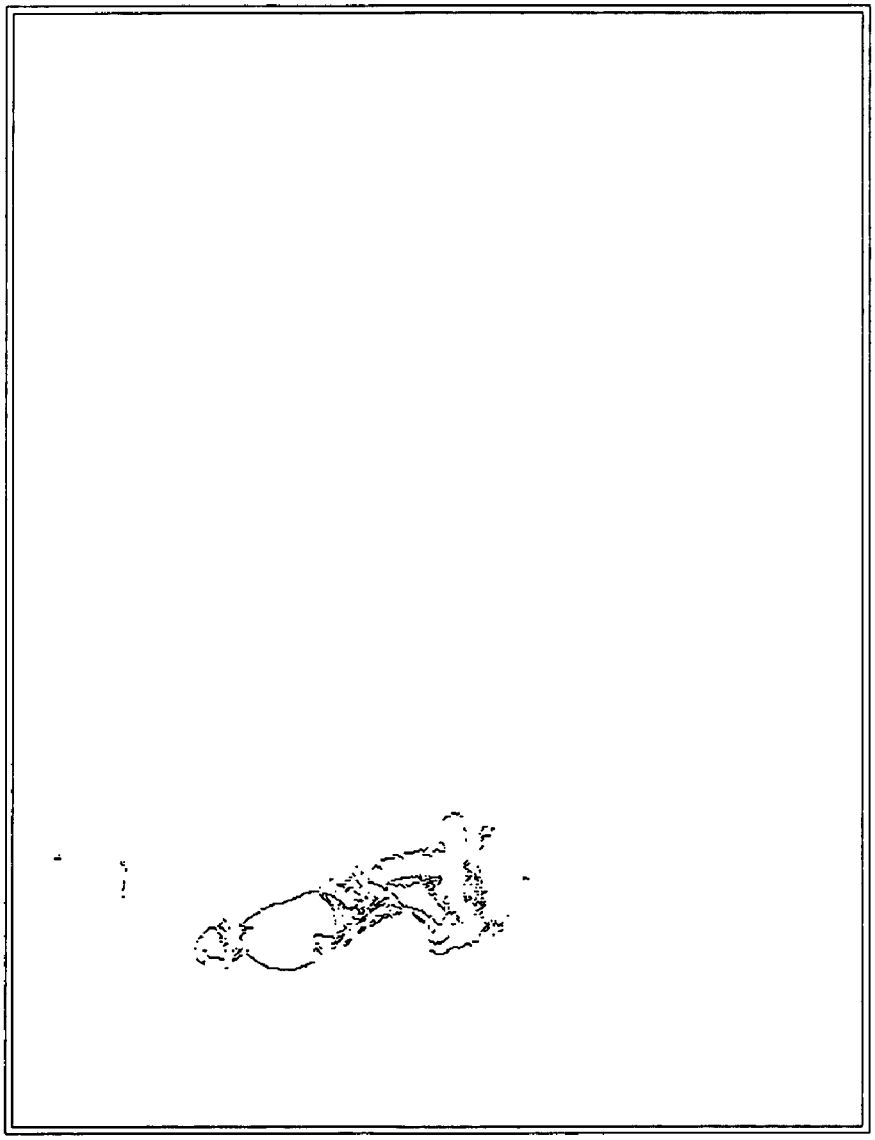
FIGS. 8A, 8B, 8C, and 8D, referred to collectively as FIG. 8, illustrate markerless head tracking in accordance with an embodiment of the invention.
Figure 8B:
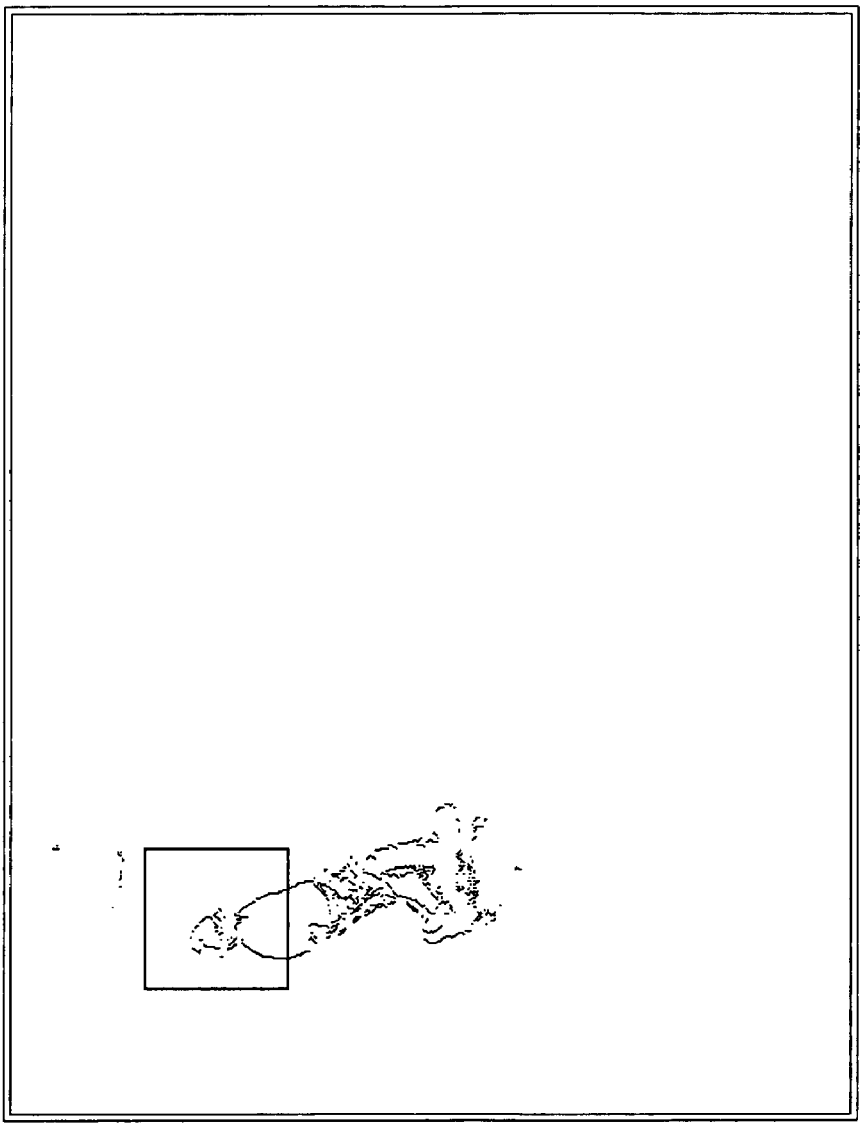
Figure 8C:
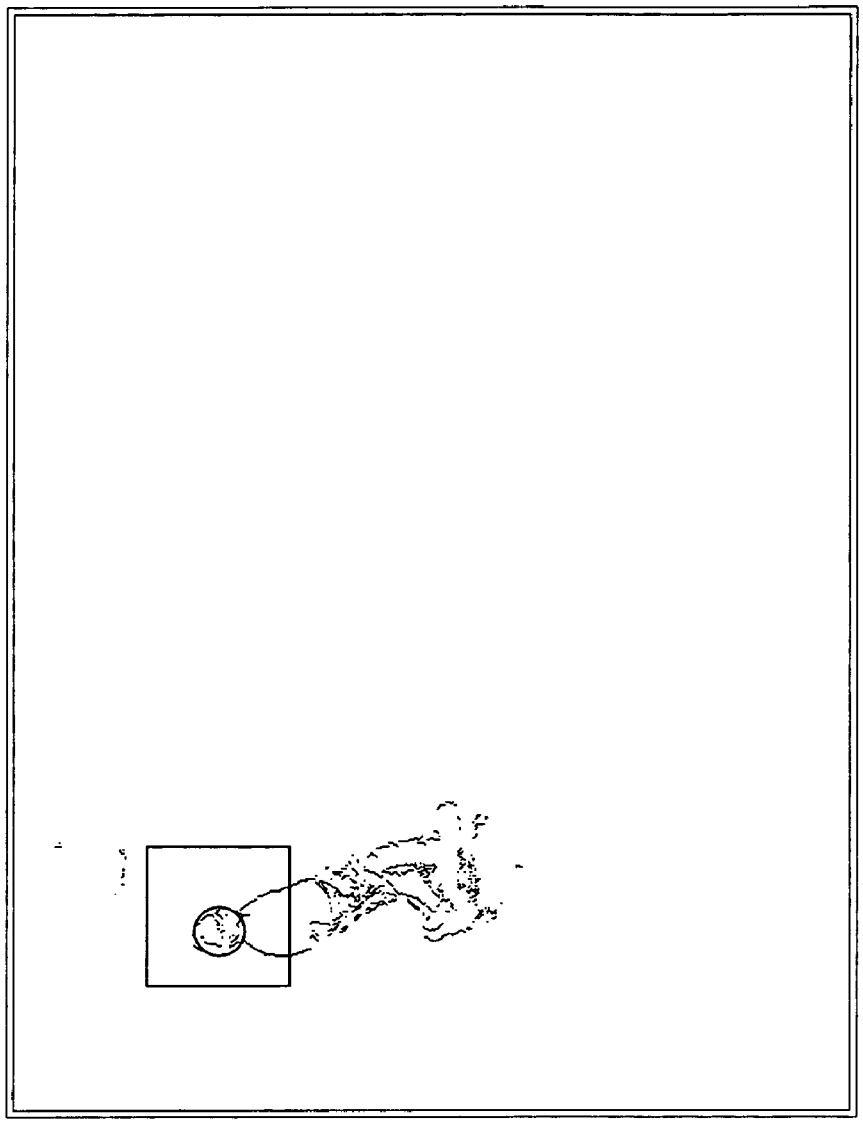
Figure 8D:
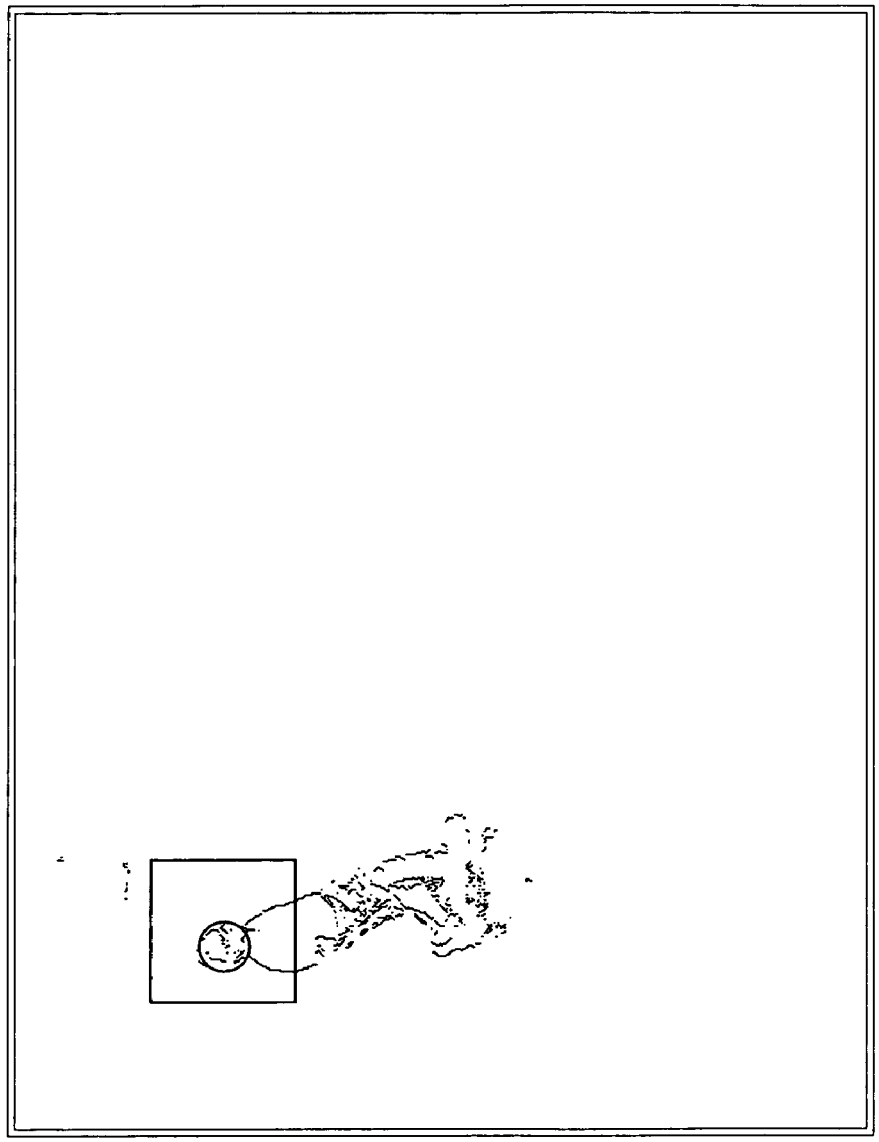

Once the candidates are identified as described above in connection with FIG. 6, the candidates are further analyzed to identify the head of a person. FIG. 7 illustrates the steps for identifying the head of a person as the person moves through the motion capture area. In step 702, an area of interest within the captured image is identified and in step 704, a Hough transform is performed on RLE contour edge data within the area of interest. Glob detection is performed on the Hough image in step 706. In step 708, the 3D coordinates for the candidate points that correspond to the globs that meet certain predefined criteria are determined. The 3D coordinates are projected back into the camera images in step 710 in order to identify candidates of interest. Once the candidates are identified, then in step 712, the subject's head is identified based upon known characteristics. Additional details of each of these steps are provided below.

Hough Transform

The location, $P_{person}$, of a candidate is typically around the person's waist since the location is based on the center of gravity of the glob. Thus, an offset is added to the initial location to estimate the location of the person's head, as shown below. Assuming that the person is standing, the offset is approximately 32 inches.

$$P_{head\_estimate} = P_{person} + P_{offset}$$

where $P_{offset} = (0, 32, 0)$.

The remaining steps refine this estimate of the location of a person's head, including confirming that the candidate corresponds to a person. The estimate $P_{head\_estimate}$ is projected into each camera image establishing a 2D point, $P_c$, for each camera, which estimates the general area of the person's head for the camera image.

$$P_c = T_{calibration}(P_{head\_estimate})$$

where $T_{calibration}$ is the camera calibration function.

A regular shaped area, $R_c$, is defined about the point $P_c$. The size of $R_c$ is determined by the uncertainty of the initial estimate (the size increases as the uncertainty increases), the expected noise in the scene (the size decreases as the expected noise increases), and the required speed of the system (the size decreases as the required speed increases). In one embodiment, $R_c$ is 100×100 pixels.

A Hough transform is performed on the 2D RLE contour edges within $R_c$ to create a head intensity image, $H_c$, which is the same width and height as $R_c$. FIGS. 8A, 9A, 10A, 11A, 12A and 13A show the RLE contour edges and FIGS. 8B, 9B, 10B, 11B, 12B and 13B show $R_c$ for cameras 1, 2, 3, 4, 5, and 6 respectively. To generate $H_c$ a center $(x_c, y_c)$ and radius r is generated for every 3 point combination—$(x_1, y_1)$, $(x_2, y_2)$, $(x_3, y_3)$—of RLE points. In one embodiment, the following method is used:

$$a = (x_2 - x_1)/(y_1 - y_2)$$

$$b = 0.5*(y_1 + y_2) - a*0.5*(x_1 + x_2)$$

$$c = (x_3 - x_2)/(y_2 - y_3)$$

$$d = 0.5*(y_2 + y_3) - c*0.5*(x_2 + x_3)$$

$x_c=(d-b)/(a-c)$ $y_e=a*x_c+b$ $r=\sqrt{(x_c-x_1)^2+(y_c-y_1)^2}$

A circle is a valid entry into the Hough image, $H_c$, if the center of the circle, $(x_c, y_c)$, is within the region $R_c$ and the radius r (in pixels) is within a specified range q. The center of q is determined by taking a sphere at the 3D location of the initial head estimate $P_{head\_estimate}$ with a radius equal to the nominal radius of a person's head (e.g. 5.5 inches), projecting this sphere into the camera image and then determining the "nominal" radius, $R_{head}$, of this projection in the camera image. The current range for q is $R_{head}+/-2$ pixels. Therefore, for a circle to be valid, the center $(x_c, y_e)$ has to be somewhere within the expected region $R_c$ and its radius has to be approximately the same as the person's head when seen at that distance in the camera image. The center coordinates are then quantized $(x_{cq}, y_{cq})$ and the Hough image at this coordinate is incremented by one (i.e. the current quantization level is 1).

$H_c(x_{cq},y_{cq})=H_c(x_{cq},y_{cq})+1$

After processing all three-point combinations of the RLE contour edges, the intensity of the Hough image $H_c$ at $(x_{cq}, y_{cq})$ represents the likelihood that the person's head is centered at this point in the image.

Glob Detection

Next the image of candidate points, $H_c$, is analyzed to reduce the number to only a few good candidate points. Glob detection is performed on $H_c$ to generate a list of globs, $G_c$, for each camera, where each glob $G_c(i)$ is the (x,y) location of the glob in the Hough image $H_c$. The globs $G_c$ also satisfy specified size and shape criteria that are based on the known characteristics of human heads. FIGS. 8C, 9C, 10C, 11C, 12C and 13C show the set of detected globs overlaid on the RLE contour edges for cameras 1, 2, 3, 4, 5, and 6 respectively. A circle is centered at each detected glob.

3D Location

Once the globs are detected, the 3D candidates, K, are generated. A set of 3D rays, $J_c$, is generated from each set of camera candidate points $G_c$. These rays are triangulated and the resulting points of the triangulations that satisfy the specified error tolerance are assigned as 3D candidates K. For the current example illustrated by FIGS. 8-13, two points were generated, $P_1=(-38.4156, 60.791, -7.32982)$ and $P_2=(-40.567, 53.8353, -3.11055)$.

Head Identification

Figure 9A:
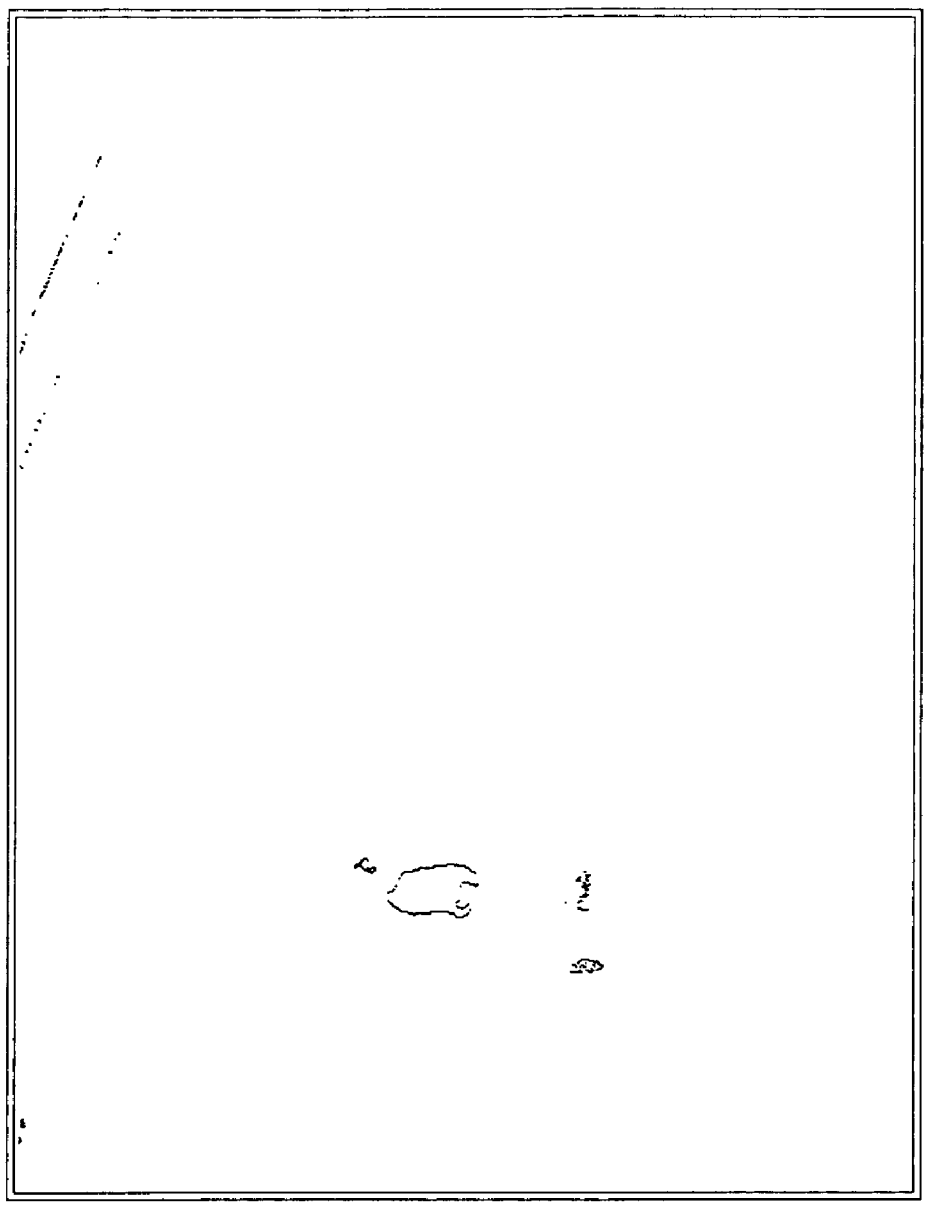
FIGS. 9A, 9B, 9C, and 9D, referred to collectively as FIG. 9, illustrate markerless head tracking in accordance with an embodiment of the invention.
Figure 9B:
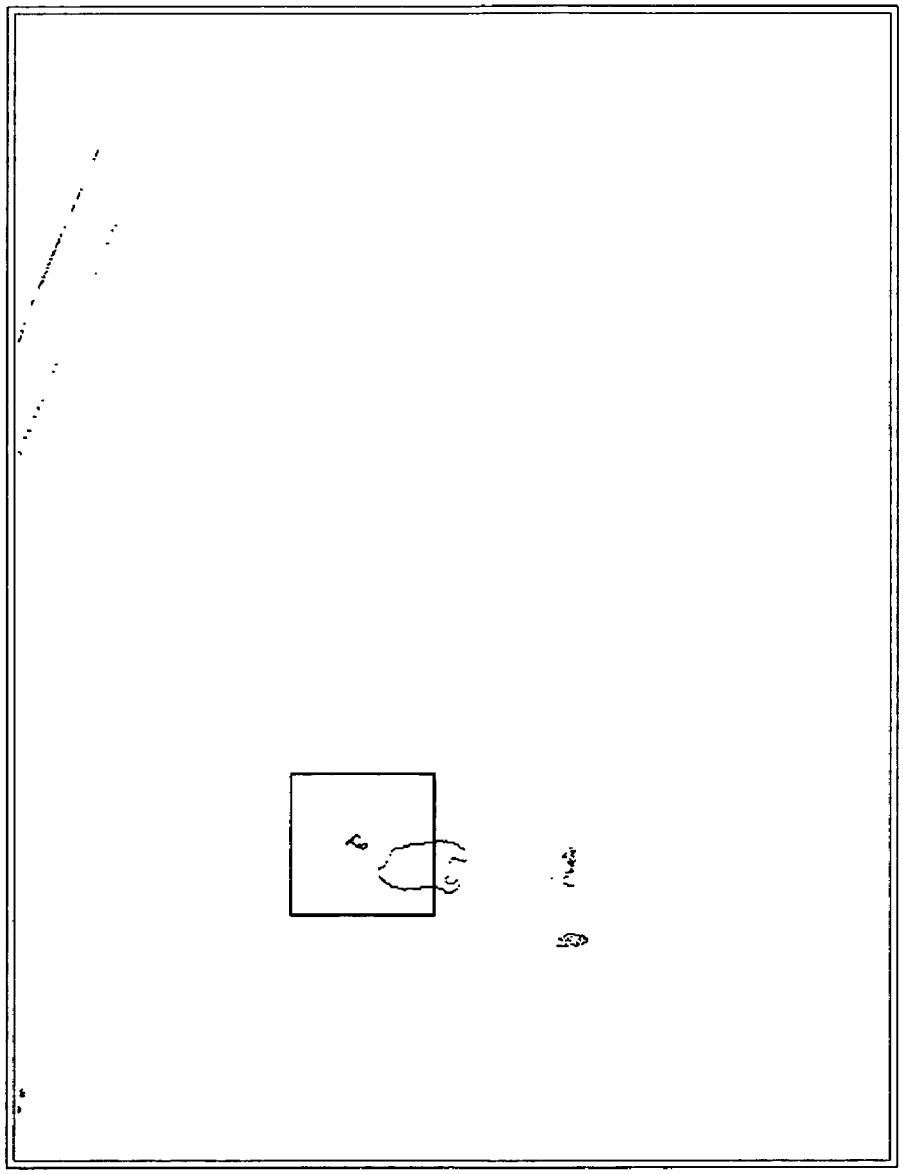
Figure 9C:
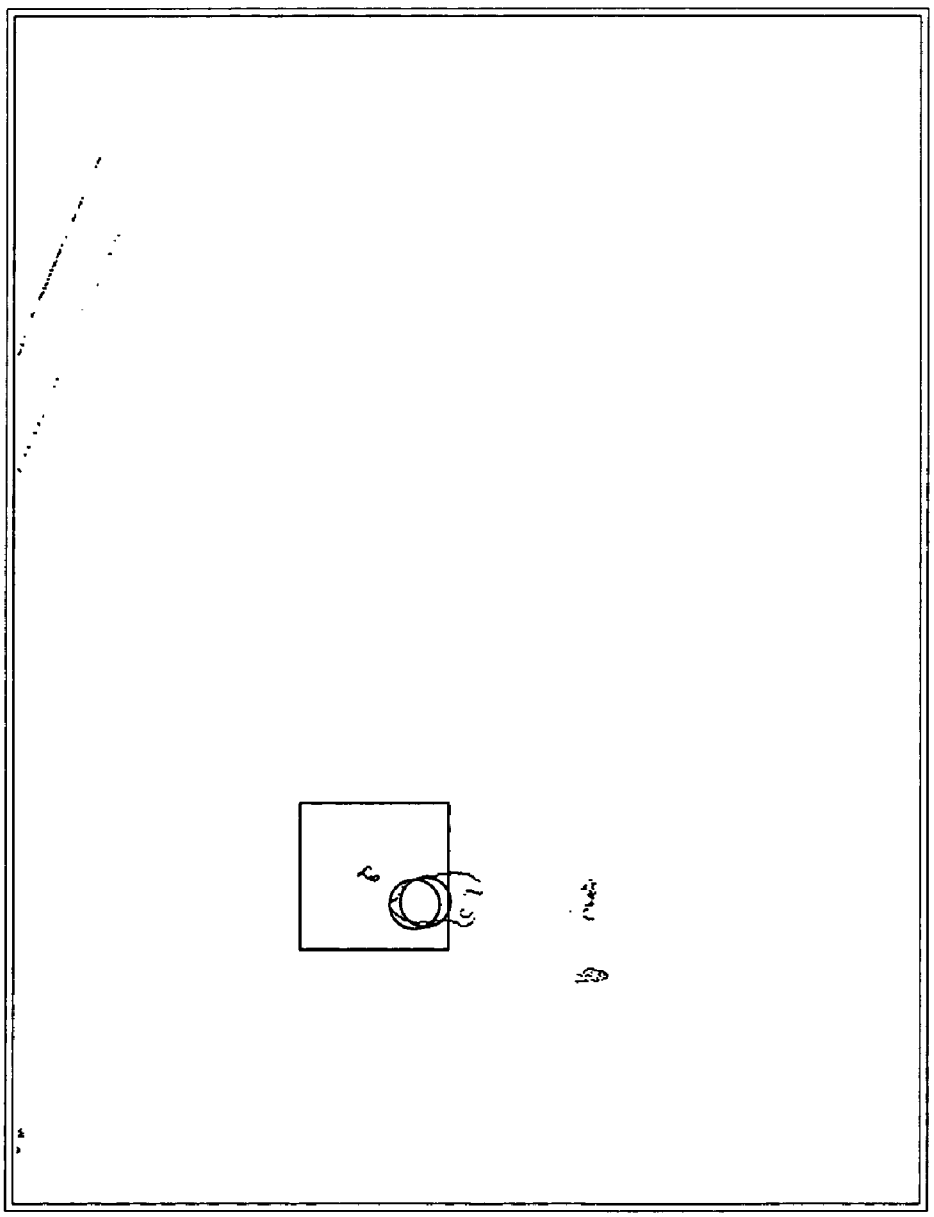
Figure 9D:
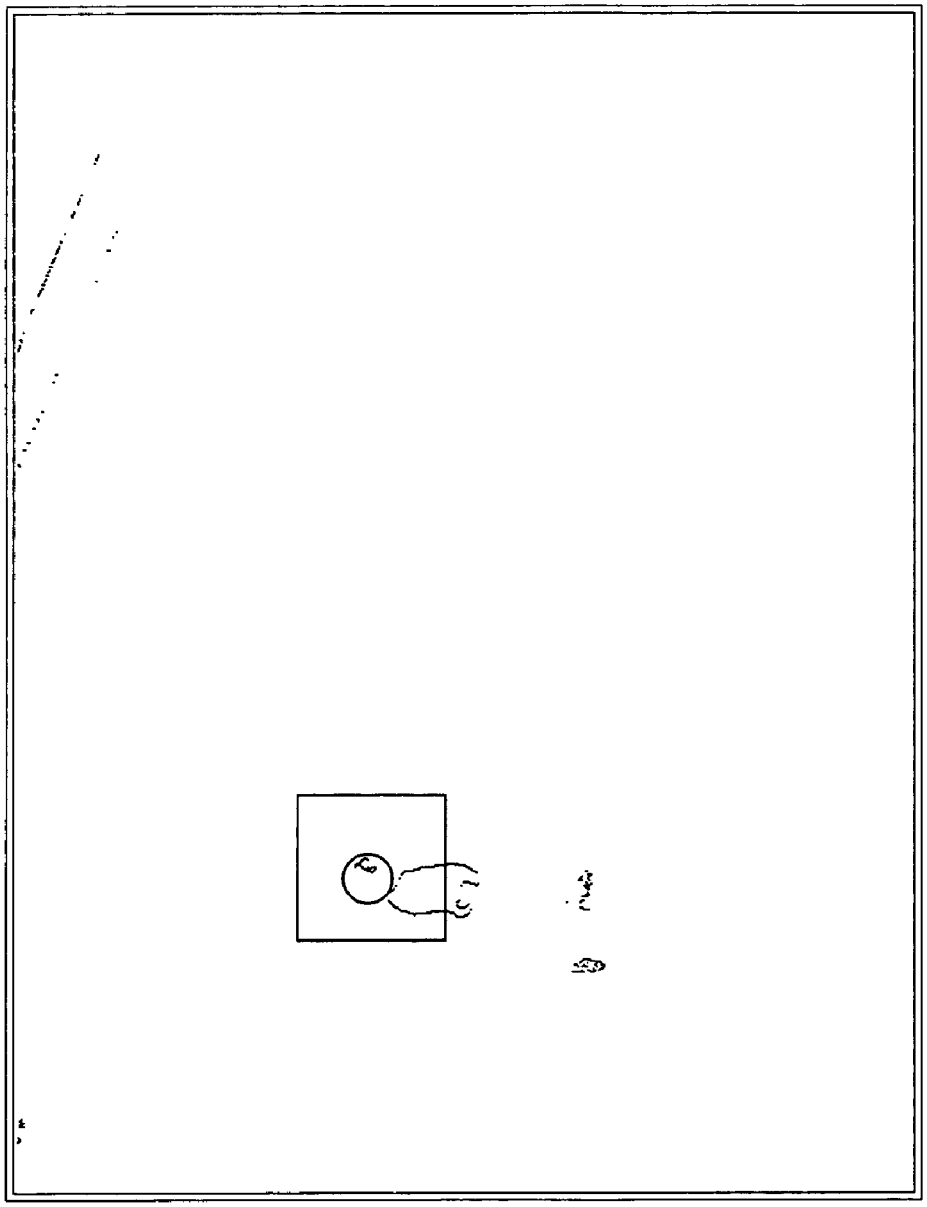
Figure 10A:
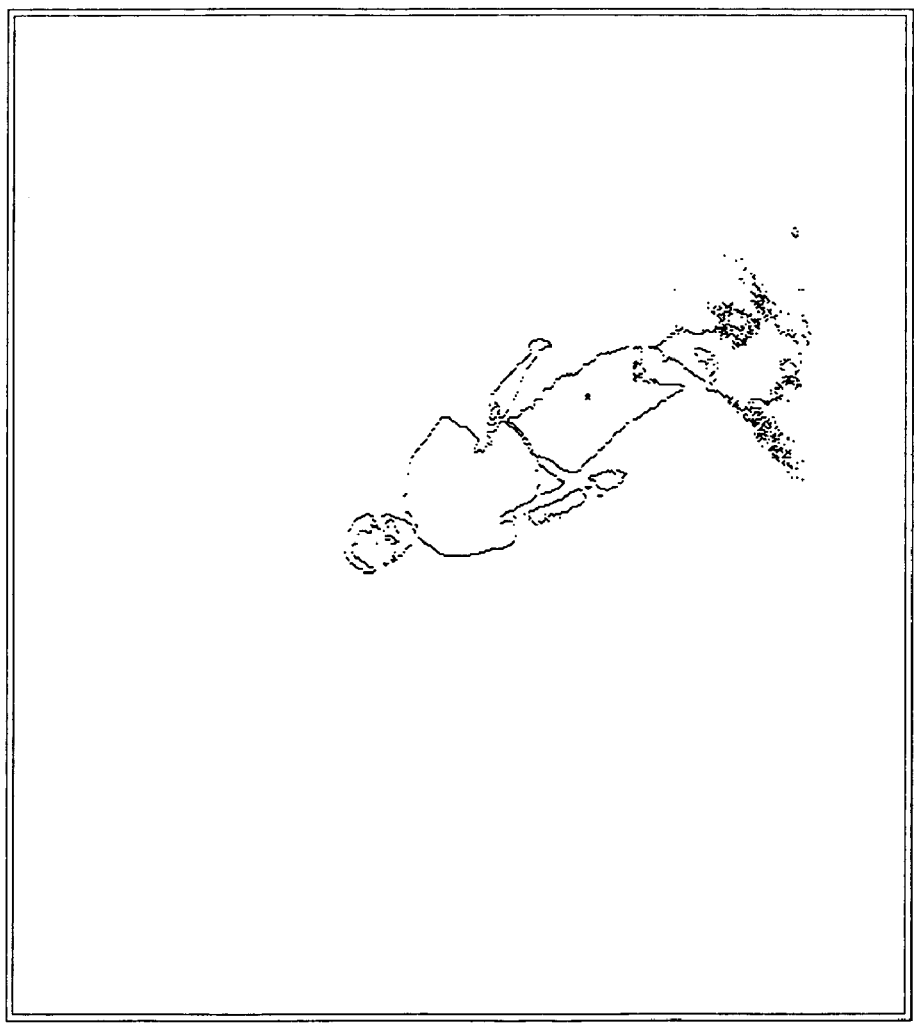
FIGS. 10A, 10B, 10C, and 10D, referred to collectively as FIG. 10, illustrate markerless head tracking in accordance with an embodiment of the invention.
Figure 10B:
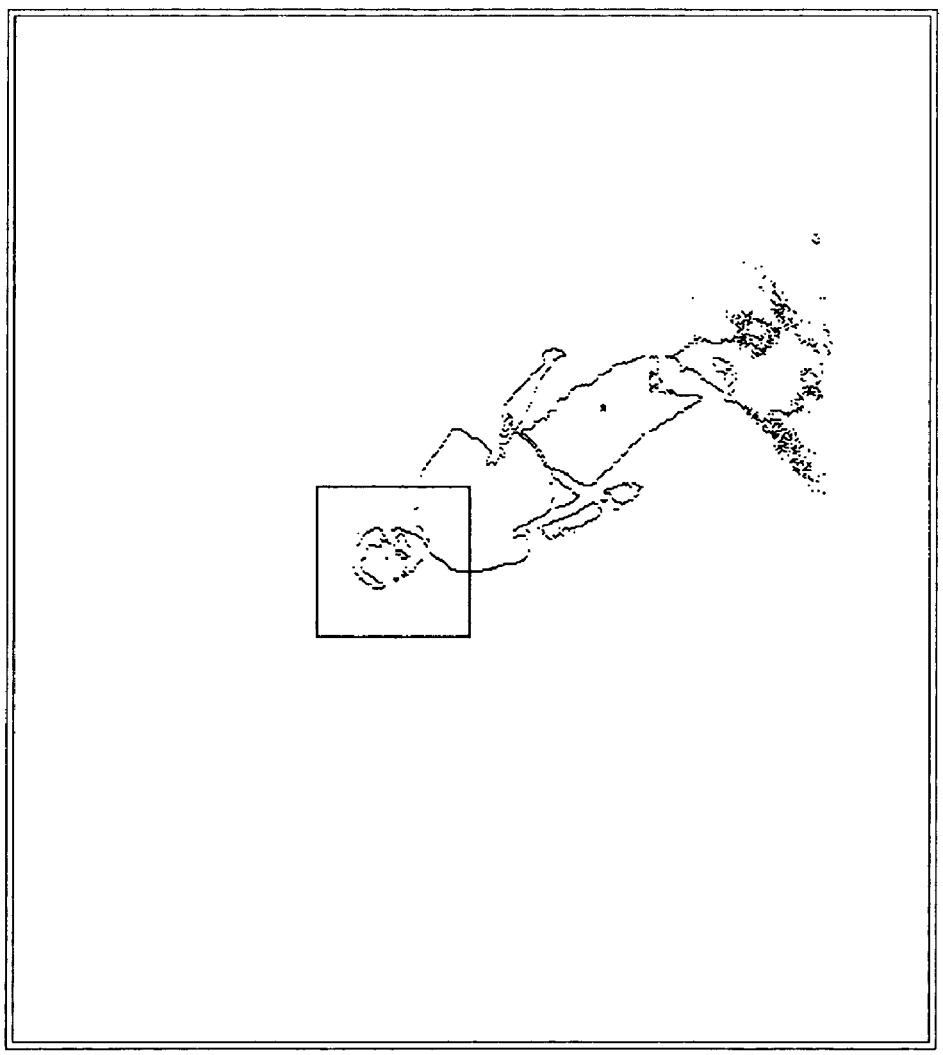
Figure 10C:
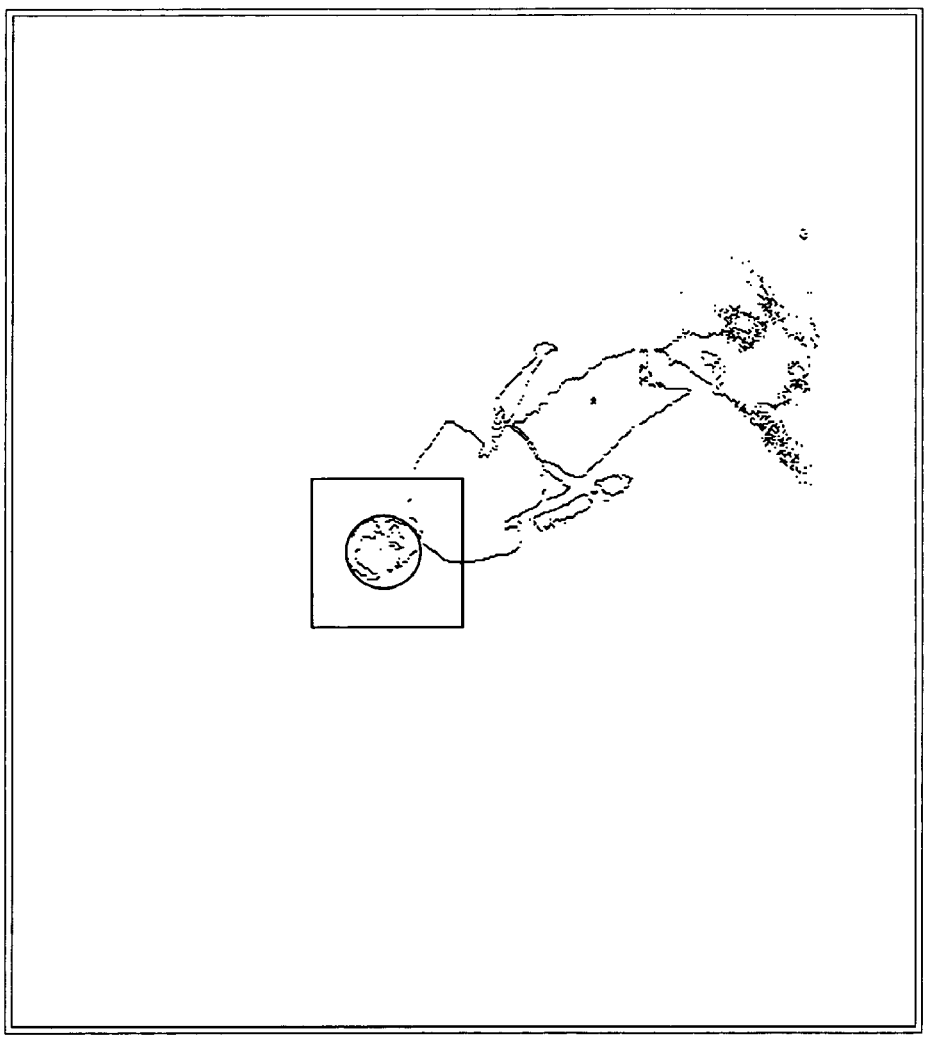
Figure 10D:
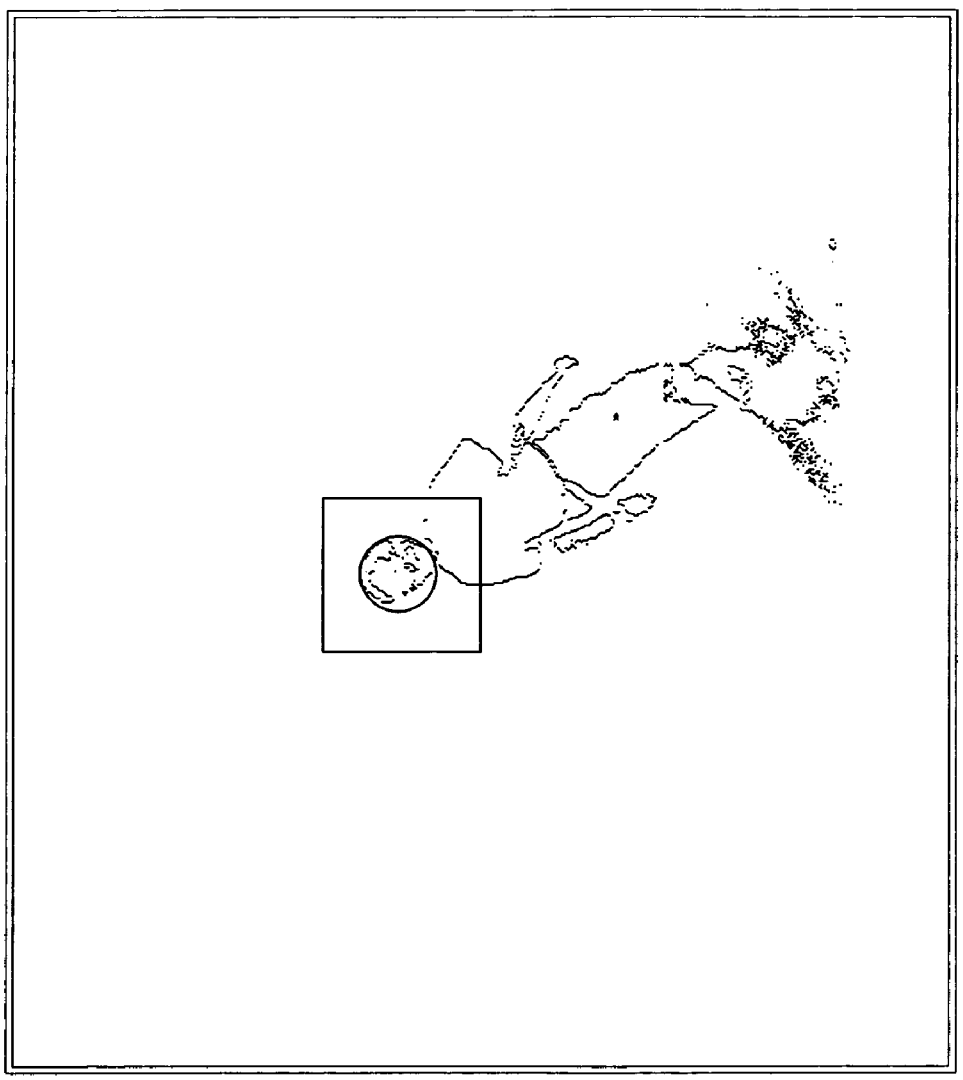
Figure 11A:
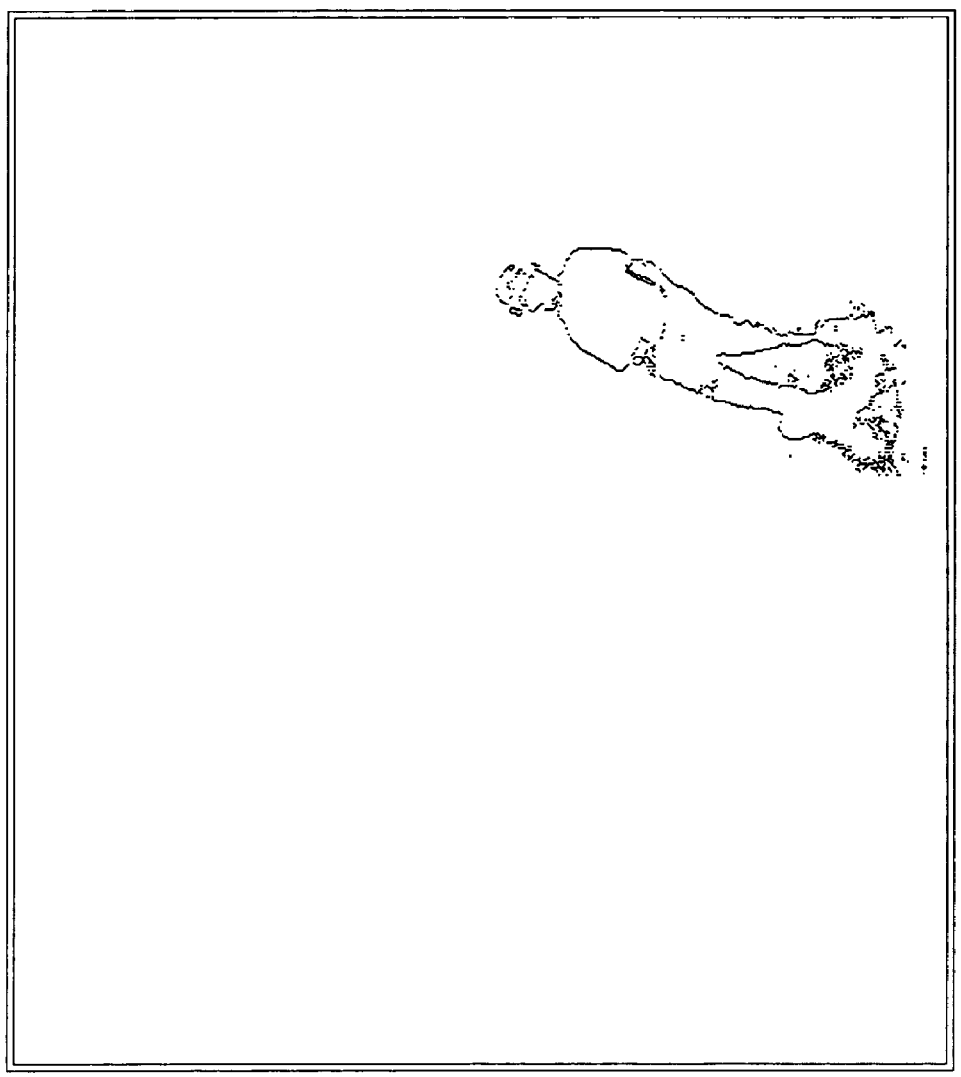
FIGS. 11A, 11B, 11C, and 11D, referred to collectively as FIG. 11, illustrate markerless head tracking in accordance with an embodiment of the invention.
Figure 11B:
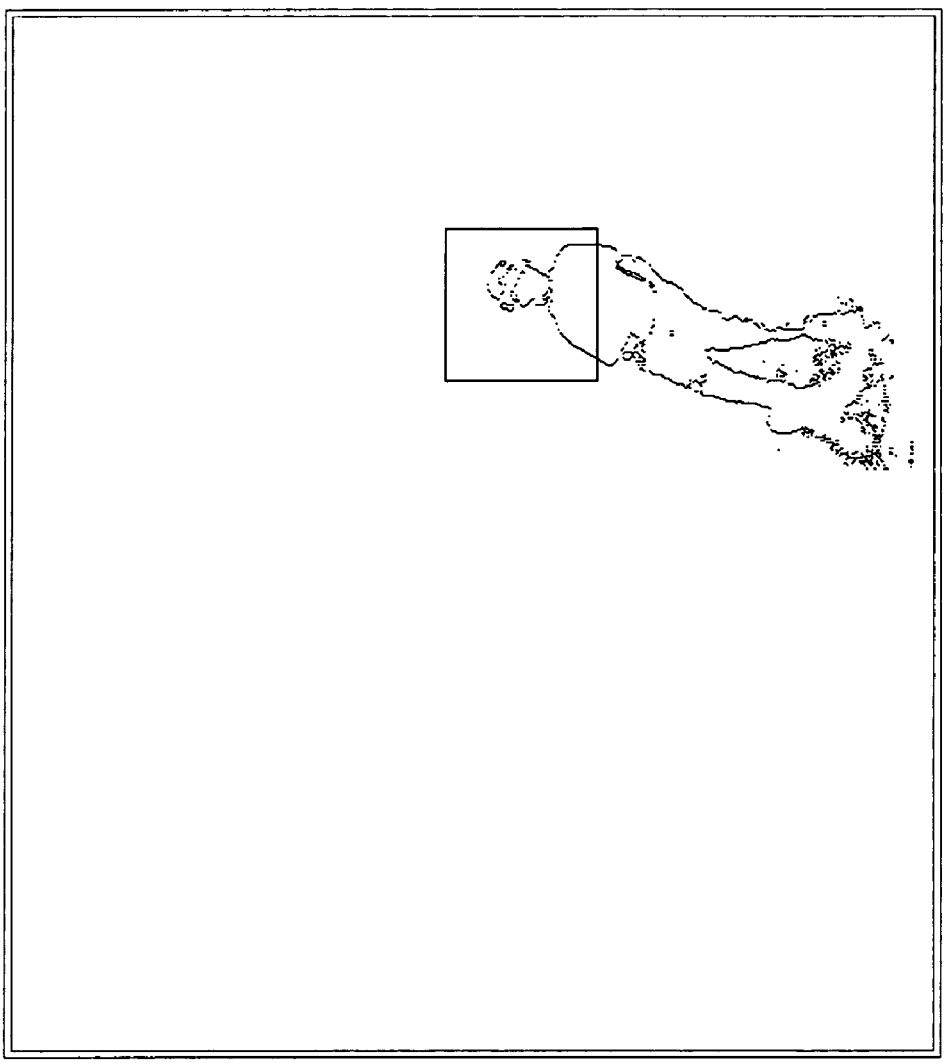
Figure 11C:
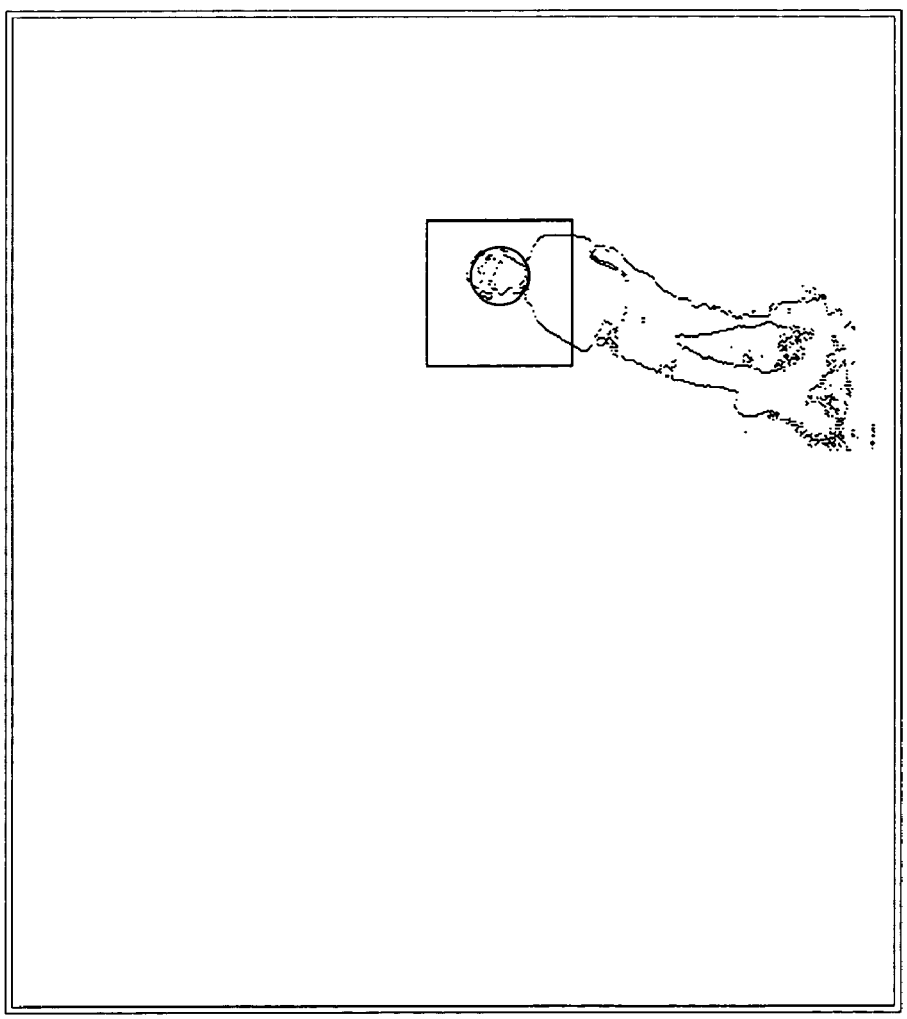
Figure 11D:
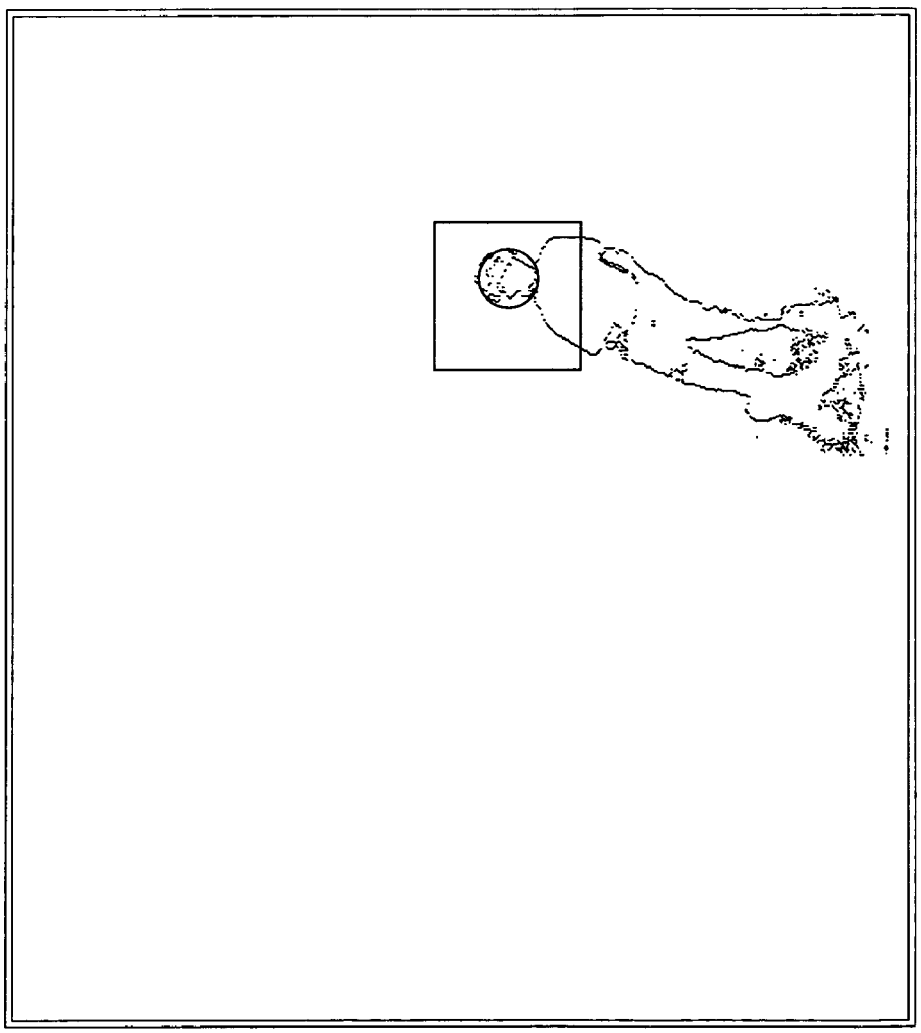
Figure 12A:
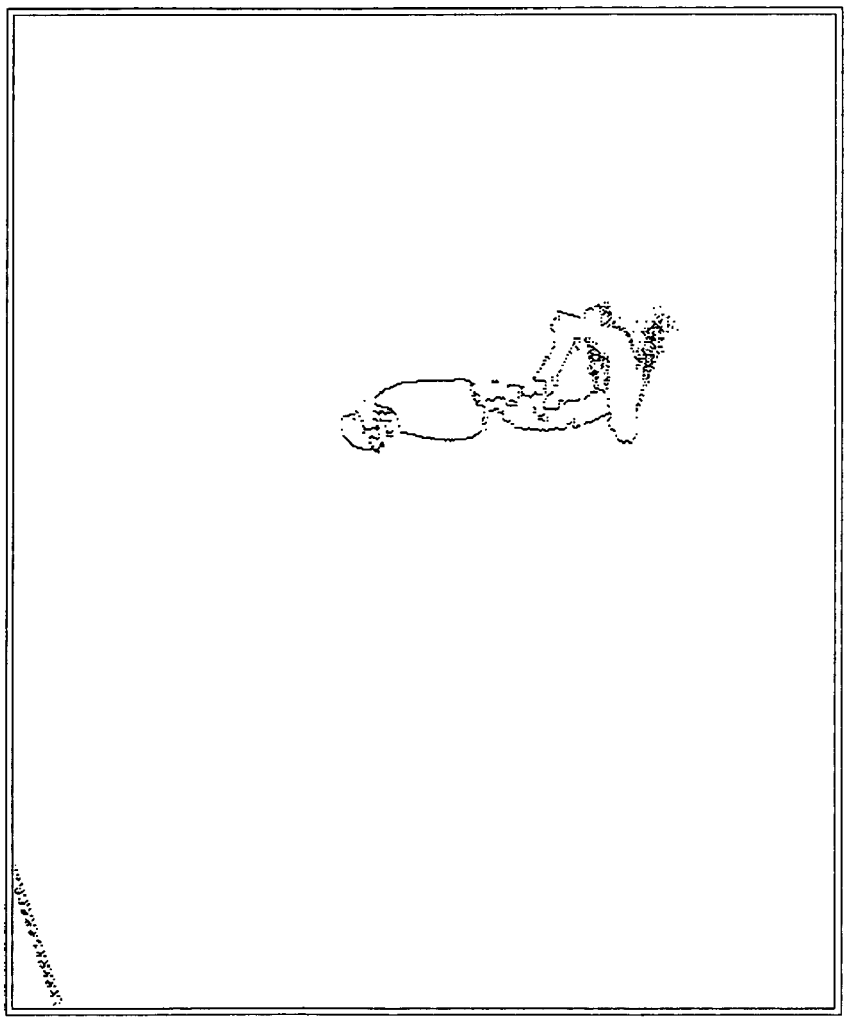
FIGS. 12A, 12B, 12C, and 12D, referred to collectively as FIG. 12, illustrate markerless head tracking in accordance with an embodiment of the invention.
Figure 12B:
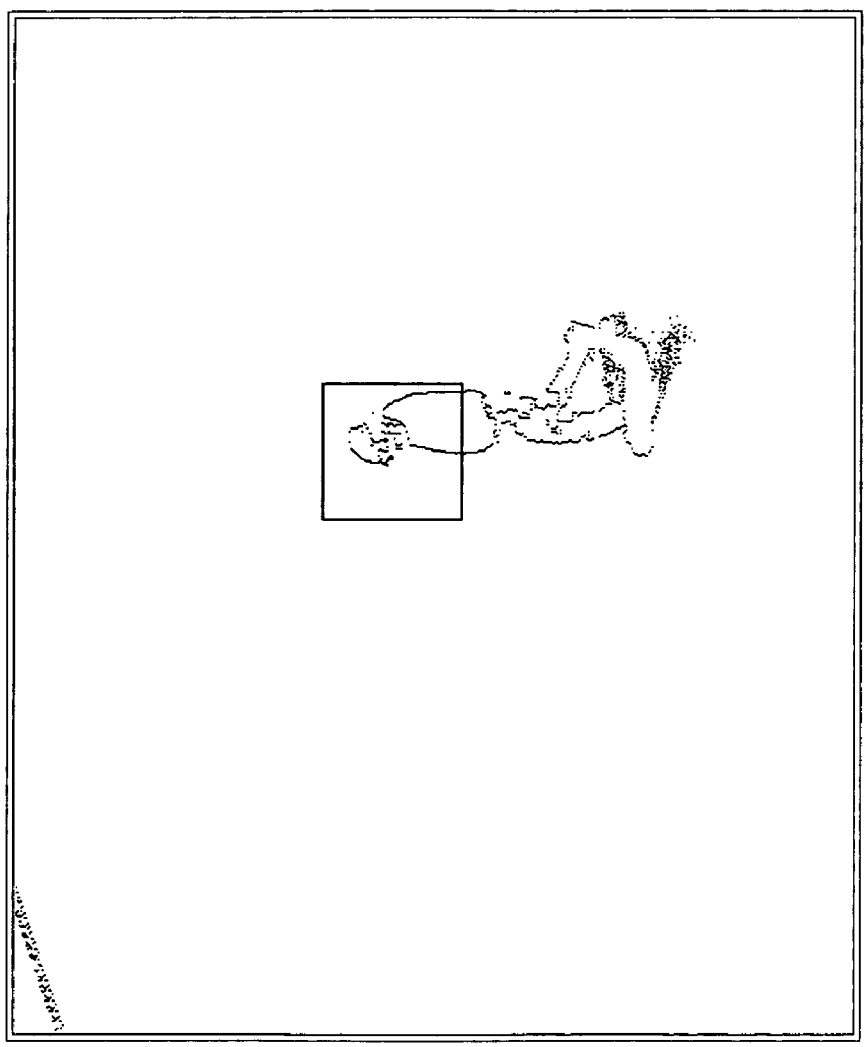
Figure 12C:
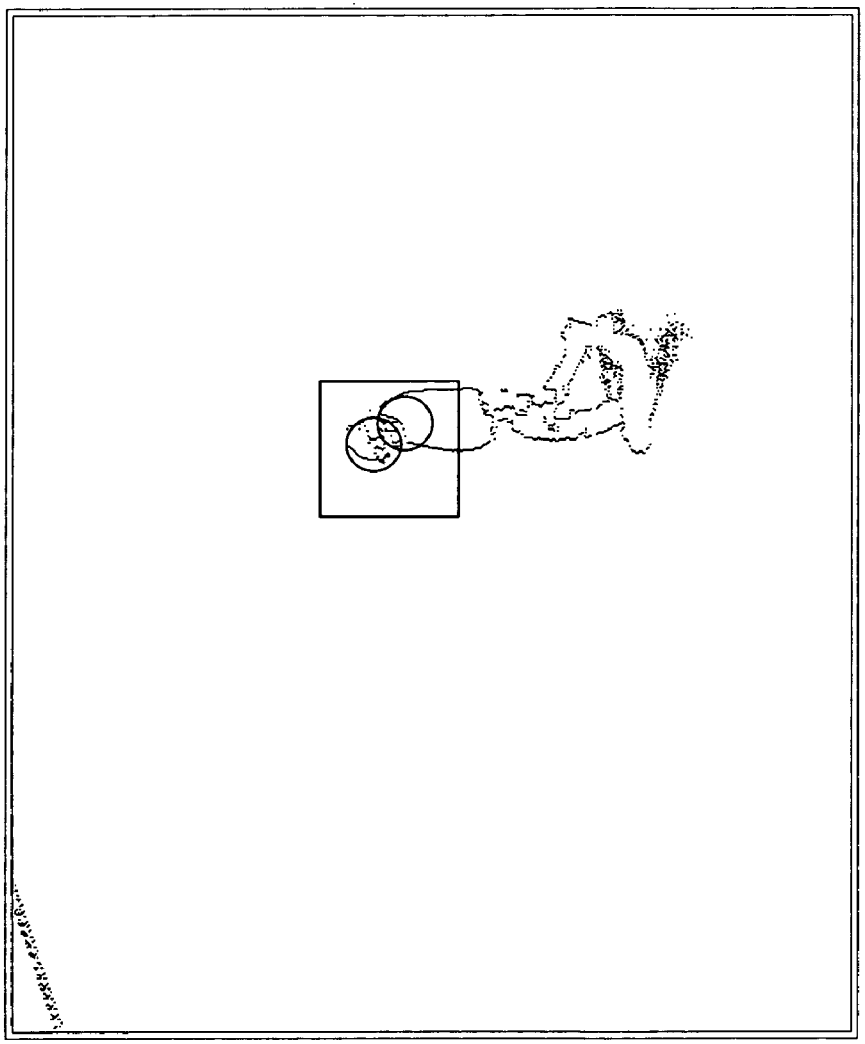
Figure 12D:
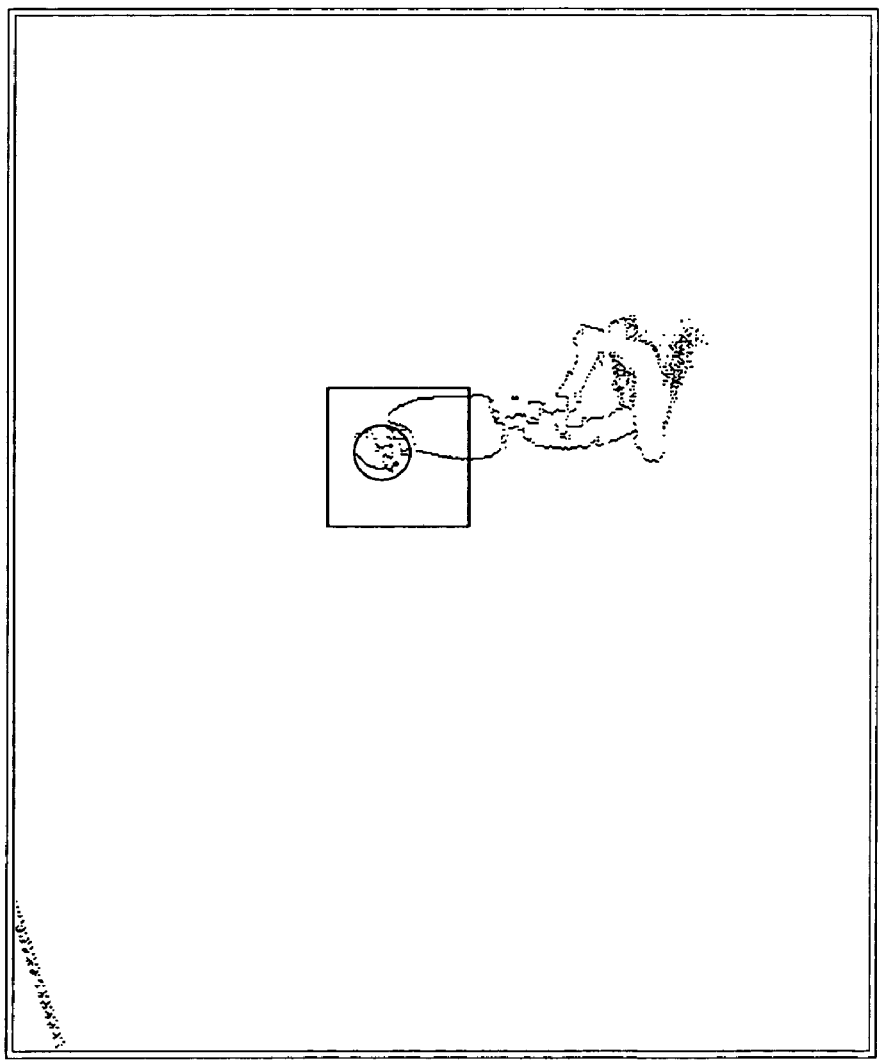
Figure 13A:
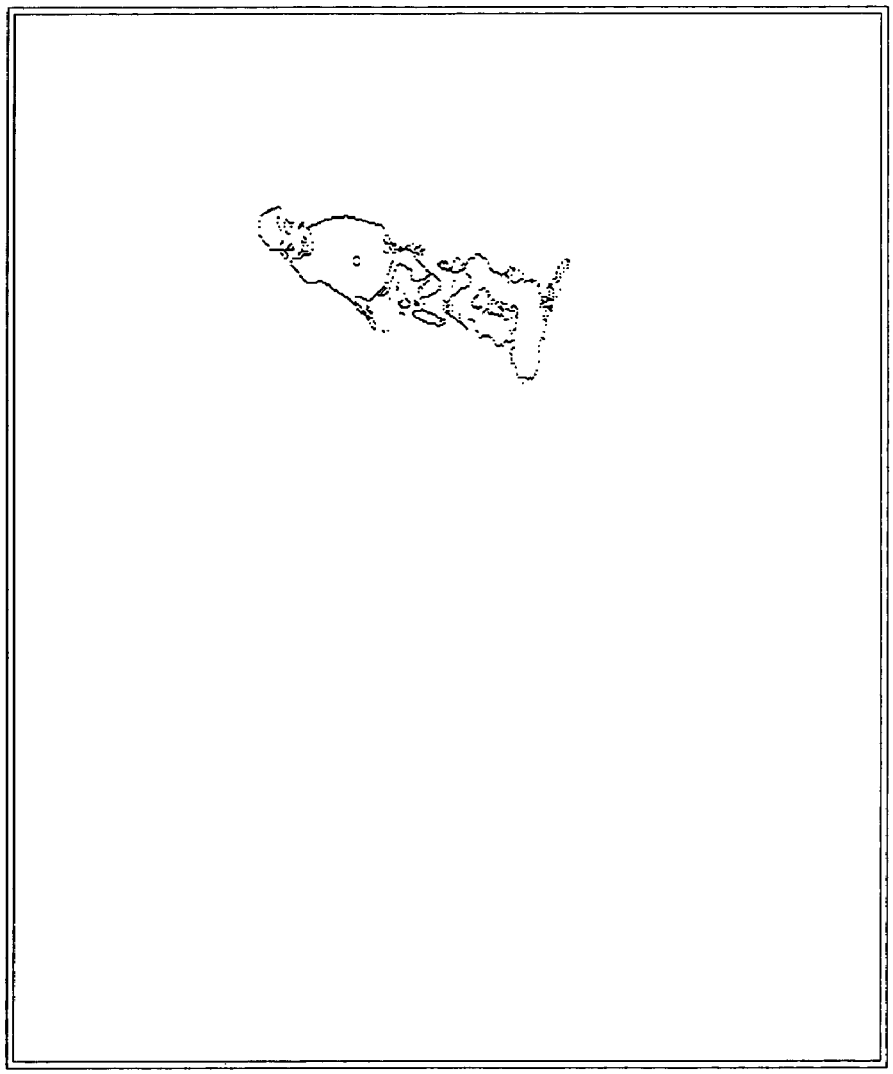
FIGS. 13A, 13B, 13C, and 13D, referred to collectively as FIG. 13, illustrate markerless head tracking in accordance with an embodiment of the invention.
Figure 13B:
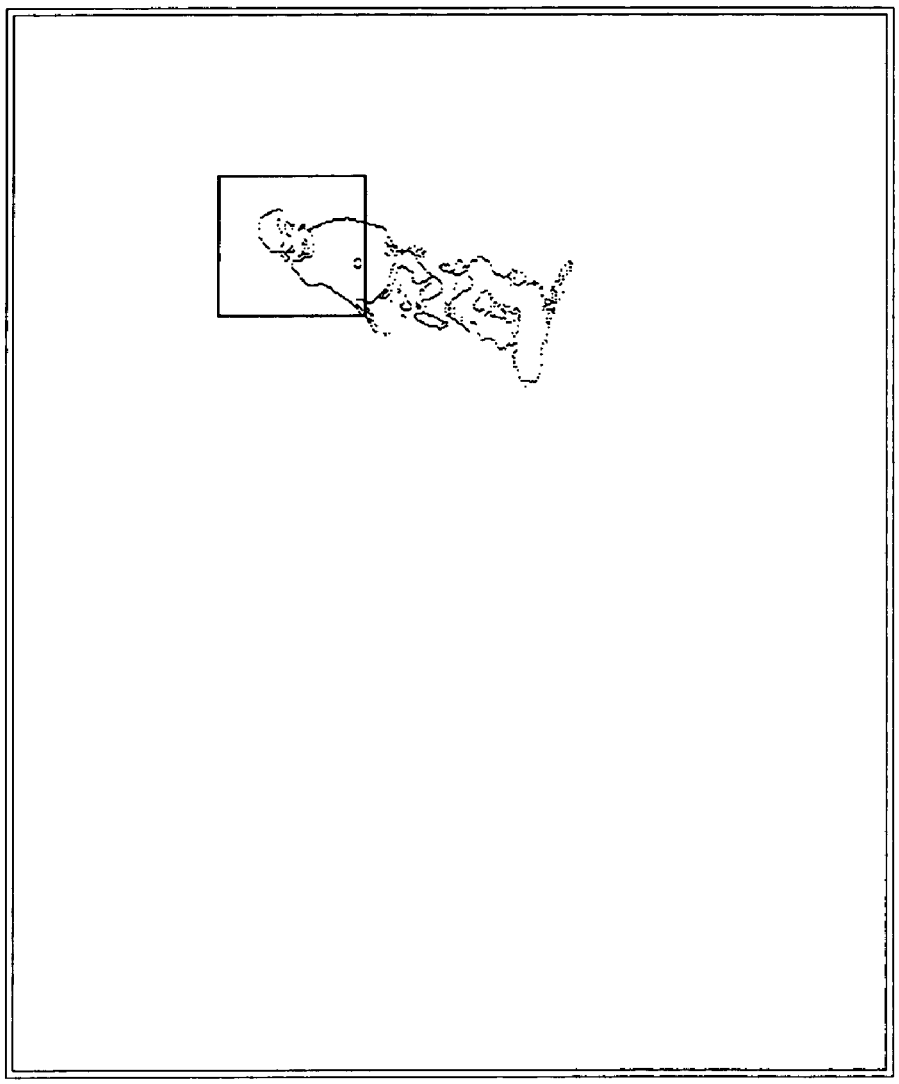
Figure 13C:
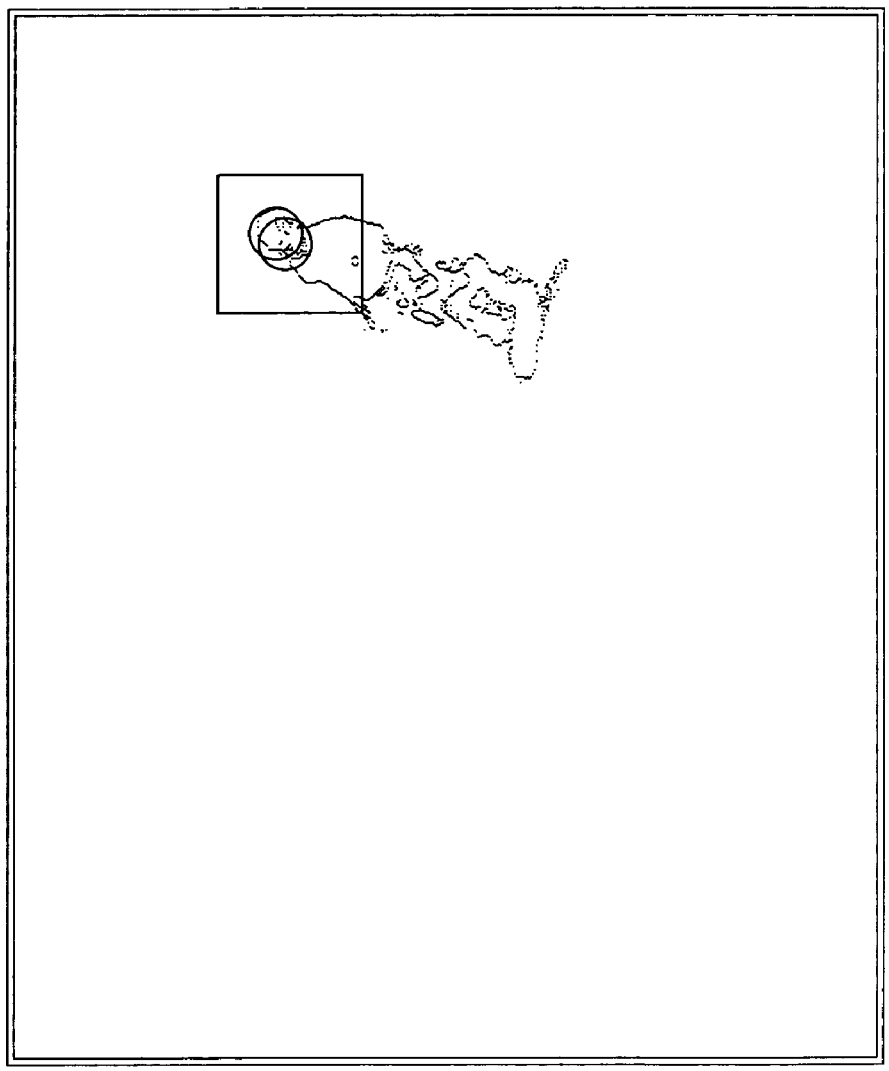
Figure 13D:
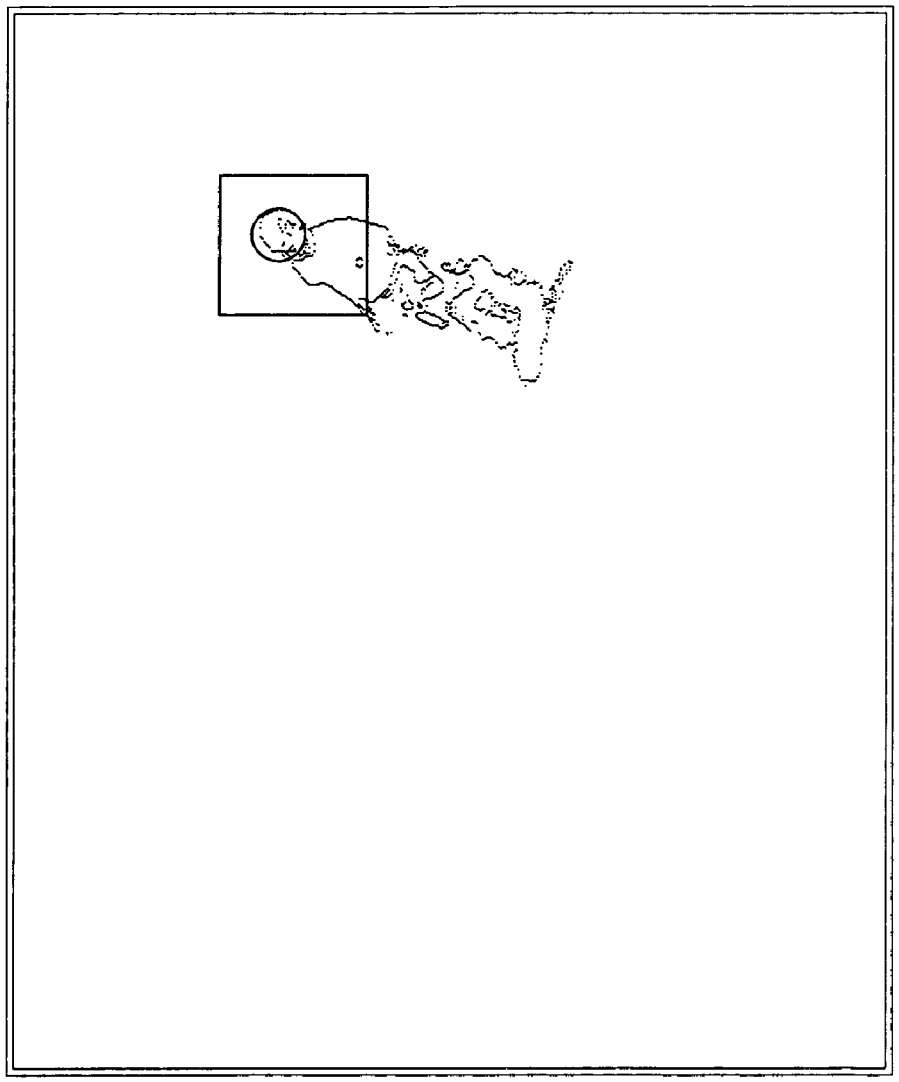

The last step is to identify which, if any, of the candidates K represent the location of the subject's head. The candidates are evaluated based on heuristic rules and the persistence of a track across multiple frames. An exemplary heuristic rule is to select the highest point from multiple candidates since it was determined that false detections frequently occur in the areas around the shoulders and that typically the head is above the shoulders for most motion captures. Compare FIGS. 12C and 12D. Applying this rule to the example resulted in a single candidate for the person's head location at $P_1=(-38.4156, 60.791, -7.32982)$, as shown in FIGS. 8D, 9D, 10D, 11D, 12D and 13D. Note that neither of the globs detected in the image from camera 2 (FIG. 9C) were associated with the 3D candidates K. However, once the candidates were projected back into the camera image from camera 2, the person's head was identified as shown by FIG. 9D.

The present invention identifies a portion of the captured image that includes the subject's head. This is advantageous in a security or surveillance application since just that portion of the image needs to be stored to identify the subject. Moreover, the stored image data can be used to create a computer generated model of the subject, which may be useful for suspect or witness identification.

Additional alternative embodiments will be apparent to those skilled in the art to which the present invention pertains without departing from its spirit and scope. For example, the parameters described herein are exemplary and additional or alternative parameters can be used. In addition, system variable rules are not limited to those exemplary rules described herein, but include any type of rule that can help predict an expected location. The image processing described herein can be performed on the central computer or on the camera depending upon the particular hardware configuration used. Markerless tracking is available for a wide range of subjects and is not limited to head tracking. Accordingly, the scope of the present invention is described by the appended claims and is supported by the foregoing description.

What is claimed is:

1. A method for capturing motion associated with a subject in real-time, comprising:
   defining a plurality of elements, wherein each element corresponds to at least one interconnected segment of the model;
   defining a plurality of marker positions, wherein each marker position is associated with an element;
   defining a predetermined condition;
   defining a value for a variable when the predetermined condition is satisfied, wherein a possible position of a first element is restricted by the value;
   for each of a plurality of frames,
      predicting locations for the markers, by:
         determining whether the predetermined condition is satisfied; and
         if the predetermined condition is satisfied, then associating the value with the variable so that the possible position of the first element is restricted; and
      measuring locations of the markers; and
      determining positions of the elements by comparing the predicted locations for the markers with the measured locations of the markers.

2. The method of claim 1, wherein defining a value for a variable when the predetermined condition is satisfied, comprises defining the value as a constant so that the possible position of the first element is a single position corresponding to the constant.

3. The method of claim 1, wherein defining a value for a variable when the predetermined condition is satisfied, comprises defining the value as a constant having a variance so that the possible position of the first element ranges around a position corresponding to the constant by an amount corresponding to the variance.

4. The method of claim 1, wherein defining a value for a variable when the predetermined condition is satisfied, comprises defining the value as a constant so that the possible position of the first element changes no more than an amount corresponding to the constant between frames.

5. The method of claim 1, wherein a pair of markers is identified and wherein a relationship between the pair of markers is predefined.

6. The method of claim 5, wherein the relationship is maintained throughout the motion.

7. The method of claim 5, wherein the relationship is maintained throughout only a portion of the motion.

8. The method of claim 1, wherein the predetermined condition is selected from the group consisting of: a specific frame, an element configuration and a combination of element configurations.

9. The method of claim 1, wherein each element is associated with a parent element, a coordinate system and an origin.

10. The method of claim 1, wherein the predetermined condition is identified based on information known about the motion.

11. A method for capturing motion associated with a subject in real-time, wherein the subject includes a plurality of interconnected segments and selected ones of the segments are associated with an element, and wherein a plurality of markers are associated with selected ones of the elements, comprising:
for each of a plurality of frames:
measuring a location for each of the markers;
predicting a location for each of the markers by:
determining whether a predetermined condition is satisfied; and
if the predetermined condition is satisfied, then associating a value with a variable, wherein a relationship between the predetermined condition, the variable and the value is predefined, and wherein a possible position of a first element is restricted when the value is associated with the variable; and
determining a configuration for the model by comparing the measured locations with the predicted locations.

12. The method of claim 11, wherein the value comprises a constant so that the possible position of the first element is a single position corresponding to the constant.

13. The method of claim 11, wherein the value comprises a constant having a variance so that the possible position of the first element ranges around a position corresponding to the constant by an amount corresponding to the variance.

14. The method of claim 11, wherein the value comprises a constant so that the possible position of the first element changes no more than an amount corresponding to the constant from one frame to another frame.

15. The method of claim 11, wherein a pair of markers is identified and wherein a relationship between the pair of markers is predefined.

16. The method of claim 15, wherein the relationship is maintained throughout the motion.

17. The method of claim 15, wherein the relationship is maintained throughout only a portion of the motion.

18. The method of claim 11, wherein the predetermined condition is selected from the group consisting of: a specific frame, an element configuration and a combination of element configurations.

19. The method of claim 11, wherein the predetermined condition is identified based on information associated with a current frame.

20. The method of claim 11, wherein the predetermined condition is identified based on information associated with a previous frame.

21. The method of claim 11, wherein the predetermined condition is identified based on information known about the motion.

22. The method of claim 11, wherein each element is associated with a parent element, a coordinate system and an origin.

23. A method for comparing motion of two subjects, comprising:
storing at least one frame representing a configuration of a first subject performing a task;
capturing motion of a second subject in real-time as the second subject performs the task by:
for each frame:
measuring a location for each of a plurality of markers associated with the second model;
predicting a location for each of the markers by determining possible positions for each marker, wherein the possible positions for a selected marker are based upon past positions of the marker; and
determining a configuration for the second subject by comparing the measured locations with the predicted locations;
comparing the configuration of the second subject to the configuration of the first subject; and
providing feedback to the second subject that quantifies any differences between the configuration of the second subject and the configuration of the first subject.

24. The method of claim 23, wherein the first subject includes a first plurality of interconnected segments and the second subject includes a second plurality of interconnected segments and wherein comparing the configuration of the first model to the configuration of the second model comprises:
calculating an overlapping volume of a first segment associated with the first model and a second segment associated with the second model.

25. The method of claim 23, wherein the first subject includes a first plurality of interconnected segments and the second subject includes a second plurality of interconnected segments and wherein comparing the configuration of the first model to the configuration of the second model comprises:
comparing a first line between a first endpoint and a second endpoint of a first segment associated with the first subject and a second line between a first endpoint and a second endpoint of a second segment associated with the second subject.

26. The method of claim 23, wherein the first subject includes a first plurality of interconnected segments and the second subject includes a second plurality of interconnected segments and wherein comparing the configuration of the first model to the configuration of the second model comprises:
comparing a subset of the first interconnected segments to a corresponding subset of the second interconnected segments.

27. The method of claim 23, wherein comparing the configuration of the first subject to the configuration of the second subject comprises:
displaying a model of the second subject overlaid on a model of the first subject.

28. The method of claim 23, wherein providing feedback to the second subject that quantifies any differences between the configuration of the second subject and the configuration of the first subject comprises providing visual feedback selected from the group consisting of a graph, a chart, a score and a difference indicator.

29. A method for markerless motion capture, comprising:
receiving a captured image having a plurality of pixels arranged in rows and columns;
analyzing the captured image on a pixel-by-pixel basis to determine a candidate, wherein the candidate includes a set of points in three-dimensional space that potentially correspond to a subject;
defining an area of interest proximate to the candidate;
performing a Hough transform on the area of interest to create a Hough image;

analyzing the Hough image on a pixel-by-pixel basis to identify a glob, wherein the glob is a set of connected hot pixels;

determining three-dimensional coordinates for candidate points that correspond to the glob;

using the three-dimensional coordinates for the candidate points to determine a candidate of interest; and comparing the candidates of interest to predetermined characteristics of the subject to track the subject's motion.

30. The method of claim 29, further comprising:

comparing characteristics of the glob with expected characteristics of the subject; and if the characteristics of the glob satisfy the expected characteristics of the subject, then identifying the candidate points corresponding to the glob.

31. The method of claim 30, further comprising:

if characteristics of the candidate of interest satisfy the predetermined characteristics of the subject, then storing data corresponding to the candidate of interest, so that the data can be used to recreate the motion of the subject.

32. The method of claim 30, wherein the subject is a person's head.

* * * * *